US011215764B2

(12) United States Patent
Smith et al.

(10) Patent No.: US 11,215,764 B2
(45) Date of Patent: Jan. 4, 2022

(54) CONFIGURABLE MODULAR CONNECTORS

(71) Applicant: 3M INNOVATIVE PROPERTIES COMPANY, St. Paul, MN (US)

(72) Inventors: Terry L. Smith, Roseville, MN (US); Michael A. Haase, St. Paul, MN (US); James M. Nelson, Lino Lakes, MN (US); Alexander R. Mathews, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/808,442

(22) Filed: Mar. 4, 2020

(65) Prior Publication Data

US 2020/0200978 A1   Jun. 25, 2020

Related U.S. Application Data

(62) Division of application No. 15/763,132, filed as application No. PCT/US2016/056330 on Oct. 11, 2016, now Pat. No. 10,620,383.

(Continued)

(51) Int. Cl.
*G02B 6/38* (2006.01)
*H01R 13/514* (2006.01)

(52) U.S. Cl.
CPC ......... *G02B 6/3829* (2013.01); *G02B 6/3838* (2013.01); *G02B 6/3866* (2013.01);
(Continued)

(58) Field of Classification Search
CPC .. G02B 6/3829; G02B 6/3838; G02B 6/3866; G02B 6/3878; G02B 6/3882; G02B 6/3885; G02B 6/3897
See application file for complete search history.

(56) References Cited

U.S. PATENT DOCUMENTS 4,305,642 A  * 12/1981  Bloodworth, Jr. ... G02B 6/4403
                                                    385/114
5,138,679 A  *  8/1992  Edwards ............. G02B 6/3869
                                                    250/227.11

(Continued)

FOREIGN PATENT DOCUMENTS

EP       0 490 698 A1     6/1992
WO    WO 2011/116164      9/2011

(Continued)

OTHER PUBLICATIONS

PCT International Search Report from PCT/US2016/056330, dated Jan. 30, 2017, 5 pages.

*Primary Examiner* — Chris H Chu
(74) *Attorney, Agent, or Firm* — Clifton F. Richardson

(57) ABSTRACT

A modular optical connector includes a plurality of coupled optical ferrule support modules. Each optical ferrule support module comprises module connecting features configured to couple each ferrule support module with one or more neighboring ferrule support modules of the plurality of ferrule support modules. One or more optical ferrules are disposed and configured to rotate within the ferrule support module. Each optical ferrule includes a first attachment area configured to attach to one or more optical waveguides. One or more passageways are disposed within the ferrule support module. Each passageway is configured to receive the one or more optical waveguides. The passageway comprises a second attachment area configured to attach to the optical waveguides that are attached to the optical ferrule at the first attachment area. The passageway is dimensioned to constrain the optical waveguides to bend within the housing between the first attachment area and the second attachment area.

2 Claims, 28 Drawing Sheets

Related U.S. Application Data

(60) Provisional application No. 62/240,003, filed on Oct. 12, 2015.

(52) U.S. Cl.
CPC .......... *G02B 6/3878* (2013.01); *G02B 6/3882* (2013.01); *G02B 6/3885* (2013.01); *G02B 6/3897* (2013.01); *G02B 6/3849* (2013.01); *H01R 13/514* (2013.01)

(56) References Cited

U.S. PATENT DOCUMENTS

| | | | |
|---|---|---|---|
| 5,231,685 A * | 7/1993 | Hanzawa | G02B 6/4292 385/139 |
| 6,786,647 B1 * | 9/2004 | Hinds | G02B 6/3825 385/55 |
| 9,279,945 B2 * | 3/2016 | McColloch | G02B 6/3885 |
| 2009/0074359 A1 | 3/2009 | Case et al. | |
| 2011/0044589 A1 | 2/2011 | Takaoka et al. | |
| 2012/0063725 A1 | 3/2012 | Meadowcroft et al. | |
| 2013/0121645 A1 | 5/2013 | Haley et al. | |
| 2013/0216189 A1 | 8/2013 | Ginderslev et al. | |
| 2015/0050019 A1 | 2/2015 | Sengupta | |
| 2015/0093922 A1 | 4/2015 | Bosscher et al. | |
| 2015/0195942 A1 | 7/2015 | Rossman | |
| 2015/0205060 A1 * | 7/2015 | Chen | G02B 6/3869 385/89 |
| 2015/0234126 A1 * | 8/2015 | Haase | G02B 6/3881 385/59 |

FOREIGN PATENT DOCUMENTS

| | | |
|---|---|---|
| WO | WO 2013/179197 | 12/2013 |
| WO | WO 2015/038941 | 3/2015 |
| WO | WO 2015/142551 | 9/2015 |

\* cited by examiner

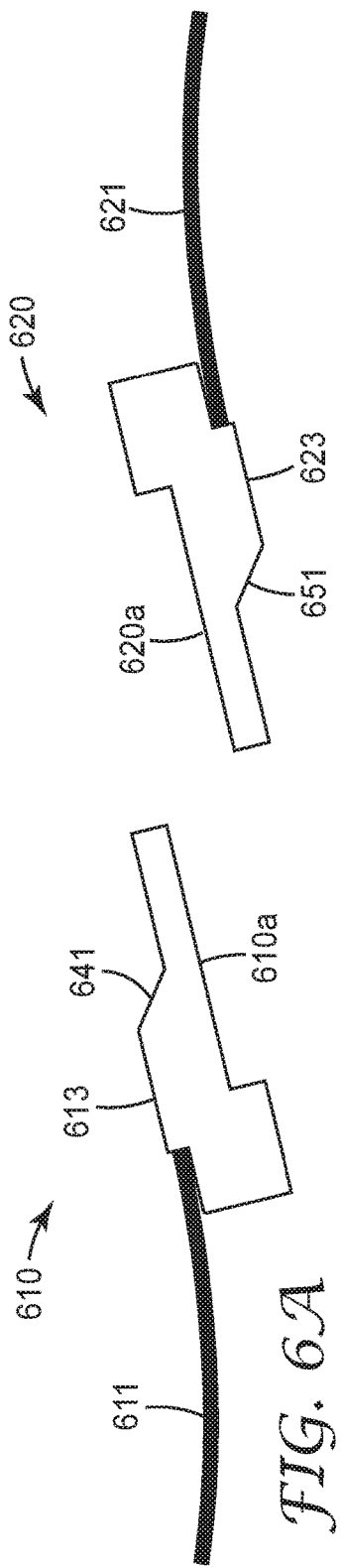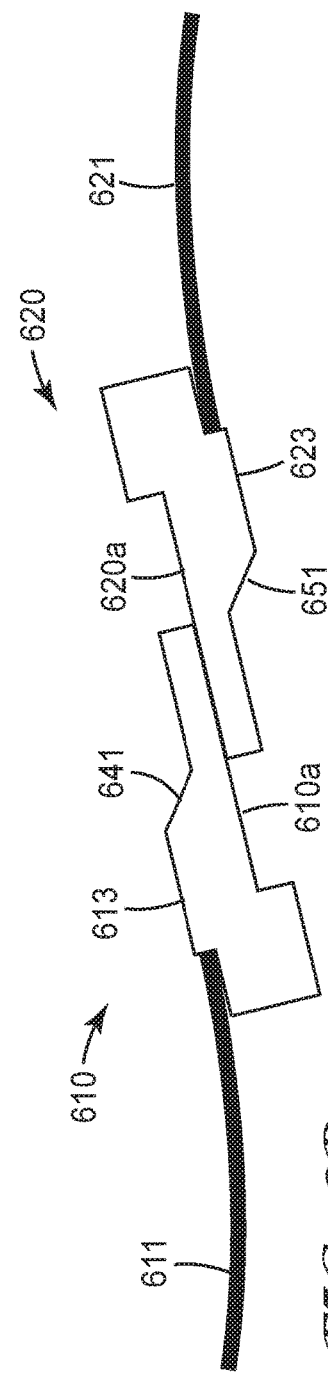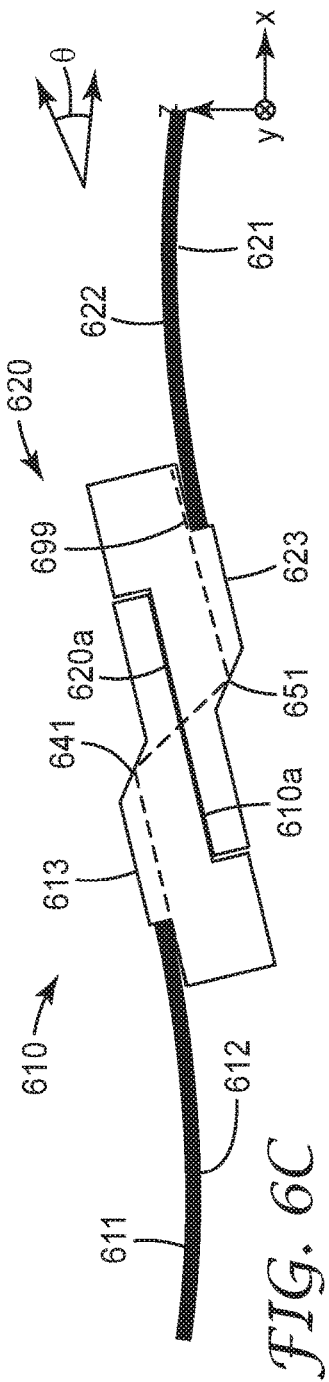

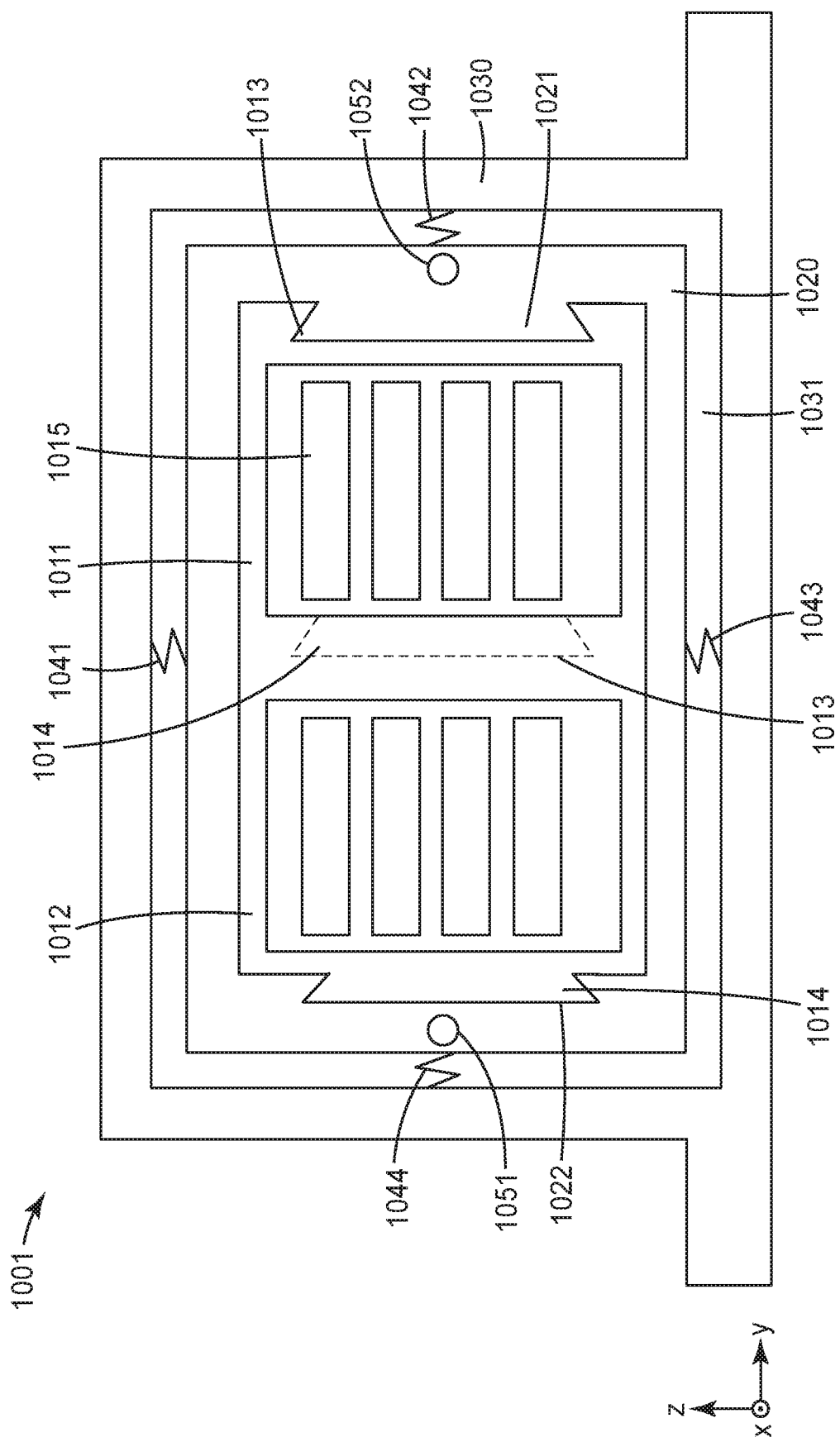

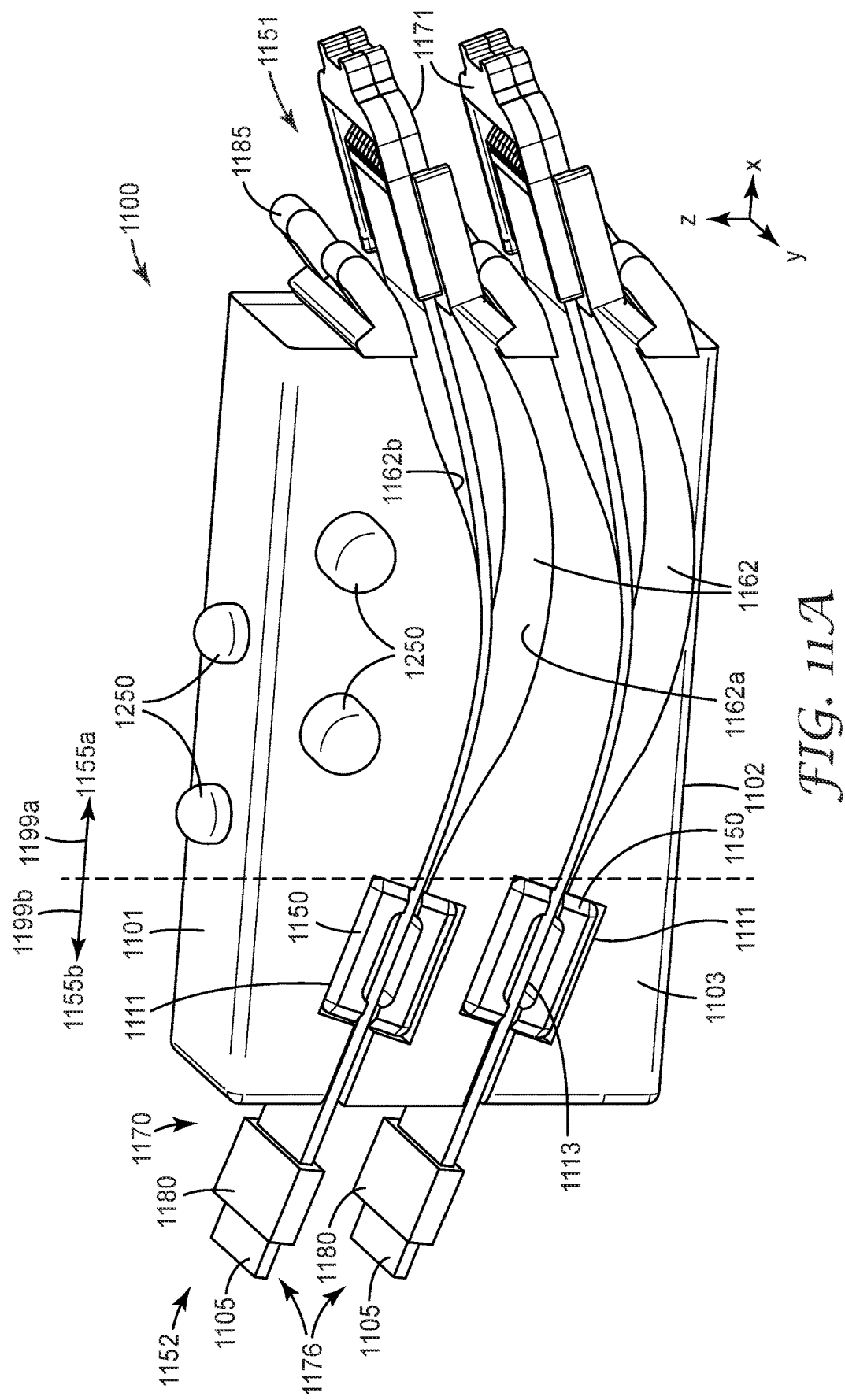

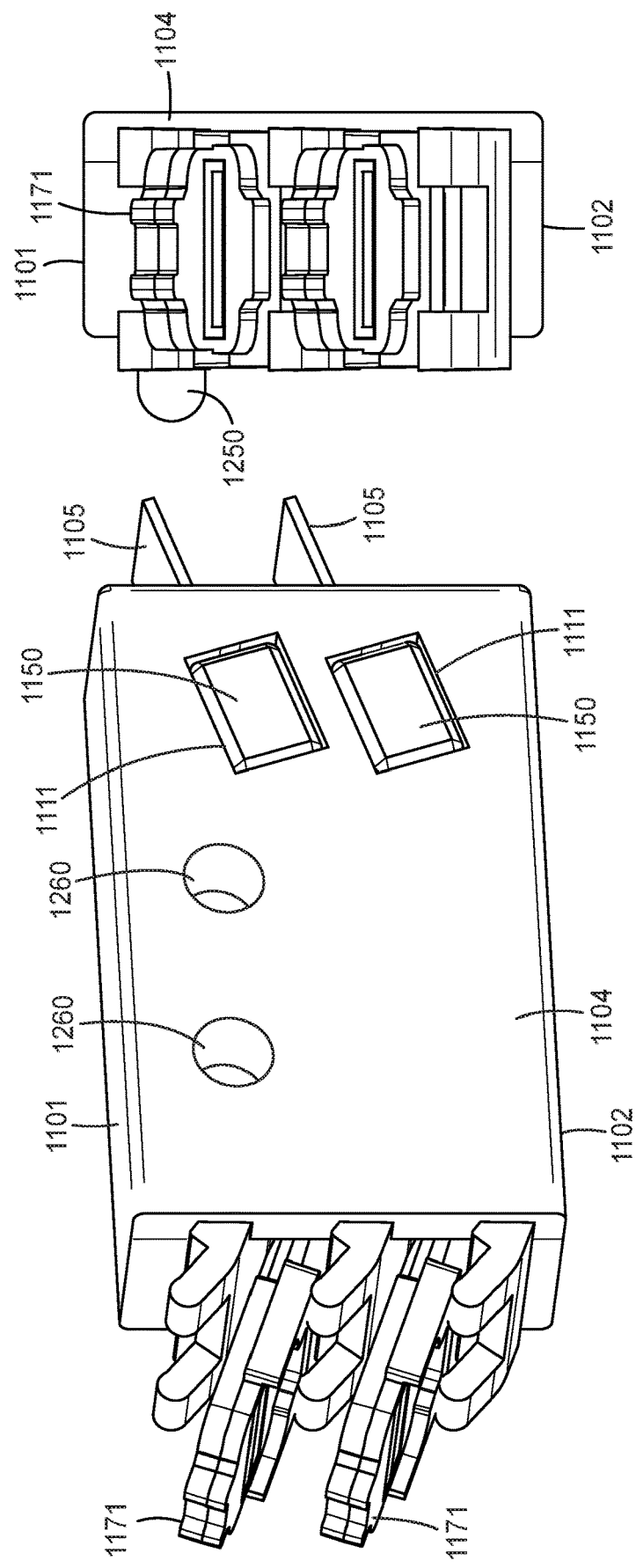

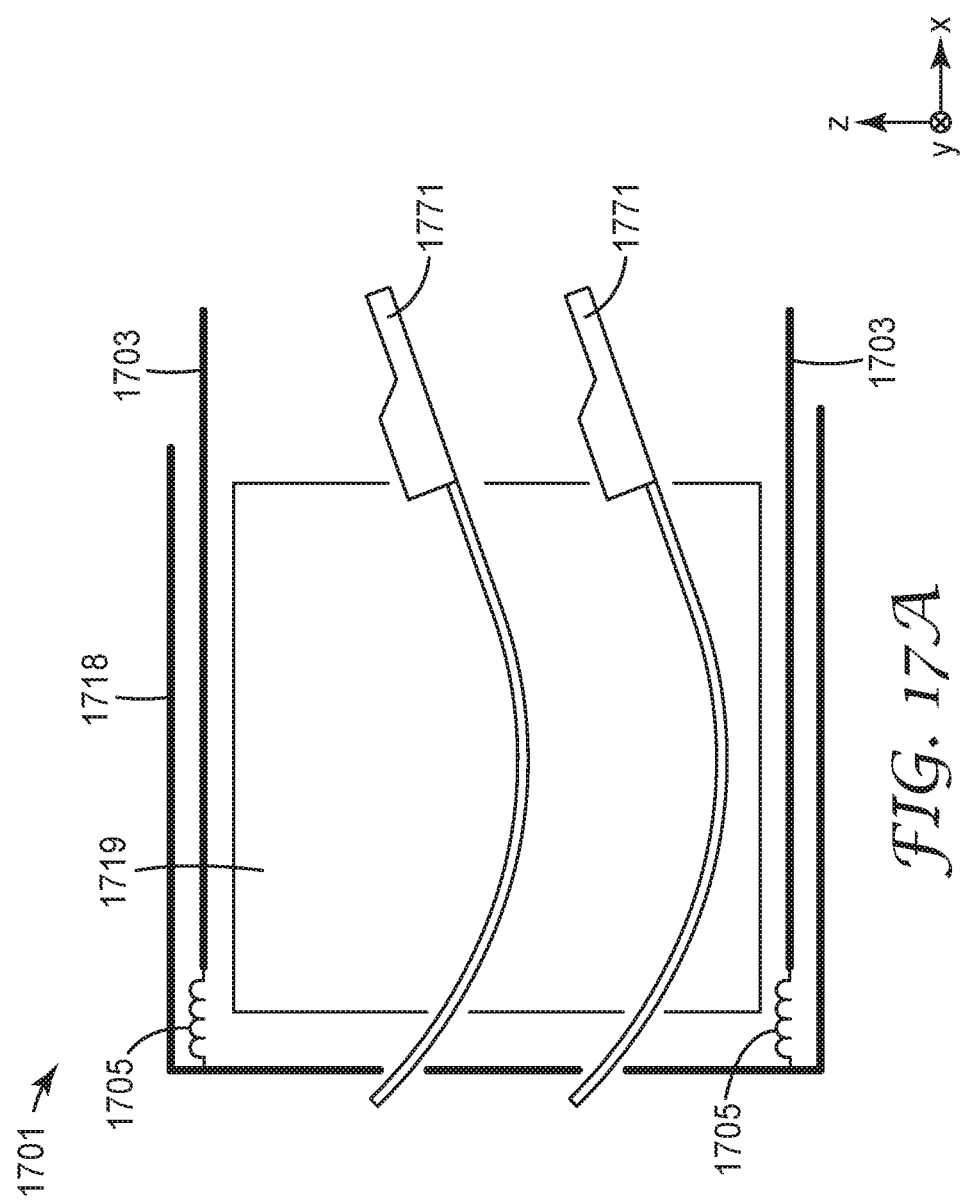

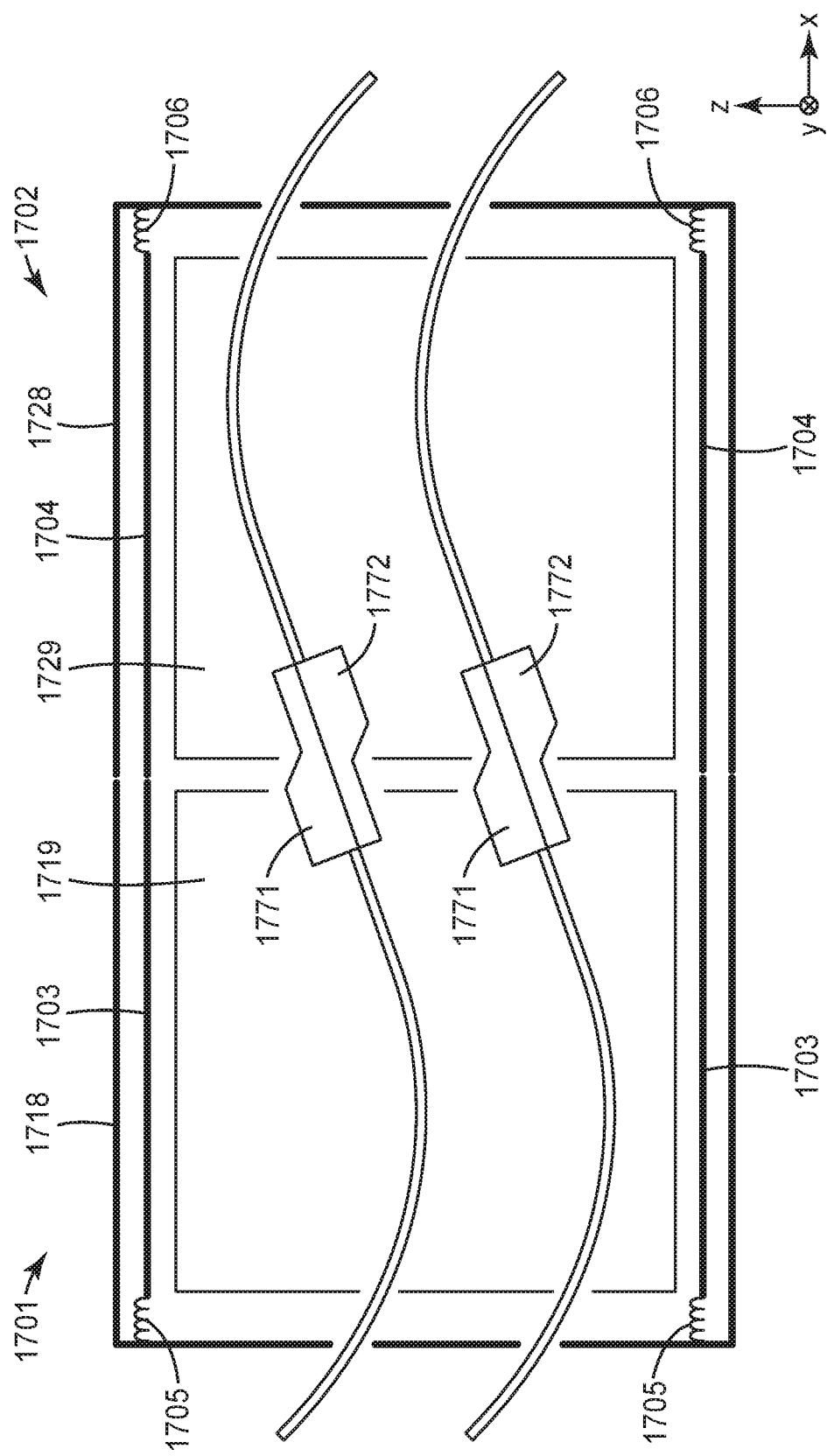

CONFIGURABLE MODULAR CONNECTORS

TECHNICAL FIELD

This disclosure relates generally to configurable optical connectors and components.

BACKGROUND

Optical signals are increasingly used to transfer information between and within electronic devices. While devices have become smaller, the number of components and the number of signals utilized by the devices has not decreased. Reduced device size limits the space available for connectors that carry the optical signals.

BRIEF SUMMARY

According to some embodiments, a modular optical connector includes a plurality of coupled optical ferrule support modules. Each optical ferrule support module comprises module connecting features configured to couple each ferrule support module with one or more neighboring ferrule support modules of the plurality of ferrule support modules. One or more optical ferrules are disposed within and configured to rotate within the ferrule support module. Each optical ferrule includes a first attachment area configured to attach to one or more optical waveguides. One or more passageways are disposed within the ferrule support module. Each passageway is configured to receive the one or more optical waveguides. The passageway comprises a second attachment area configured to attach to the optical waveguides that are attached to the optical ferrule at the first attachment area. The passageway is dimensioned to constrain the optical waveguides to bend within the housing between the first attachment area and the second attachment area.

BRIEF DESCRIPTION OF DRAWINGS

FIGS. 6A through 6C are a sequence of side view illustrations that depict two expanded beam optical ferrules before (FIG. 6A) during (FIG. 6B) and after (FIG. 6C) mating;

FIGS. 10A and 10B depict modular connectors comprising frames in accordance with some embodiments;

FIGS. 11A through 11D and illustrate optical ferrule support modules having partial sidewalls that expose curved passageways within the support modules in accordance with some embodiments;

FIGS. 17A and 17B depict side views of modular connectors having spring actuated retractable protective shrouds.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments disclosed herein relate to optical connectors formed from modular components. The modular components can be combined in different arrangements to provide flexibility in connector configurations.

Figure 1A:
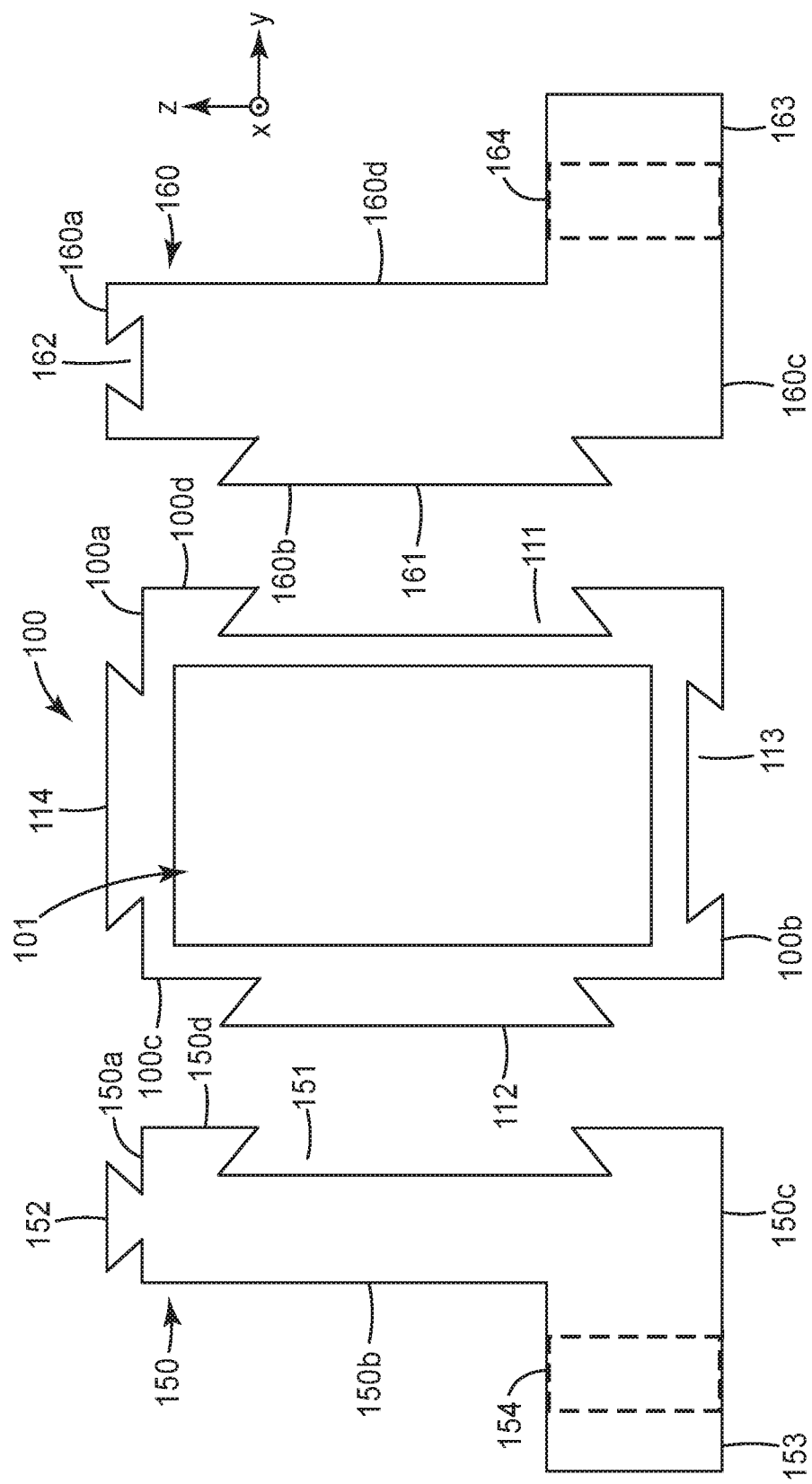
FIGS. 1A and 1B illustrate an optical ferrule support module 100 for a modular optical connector in accordance with some embodiments.
Figure 1B:
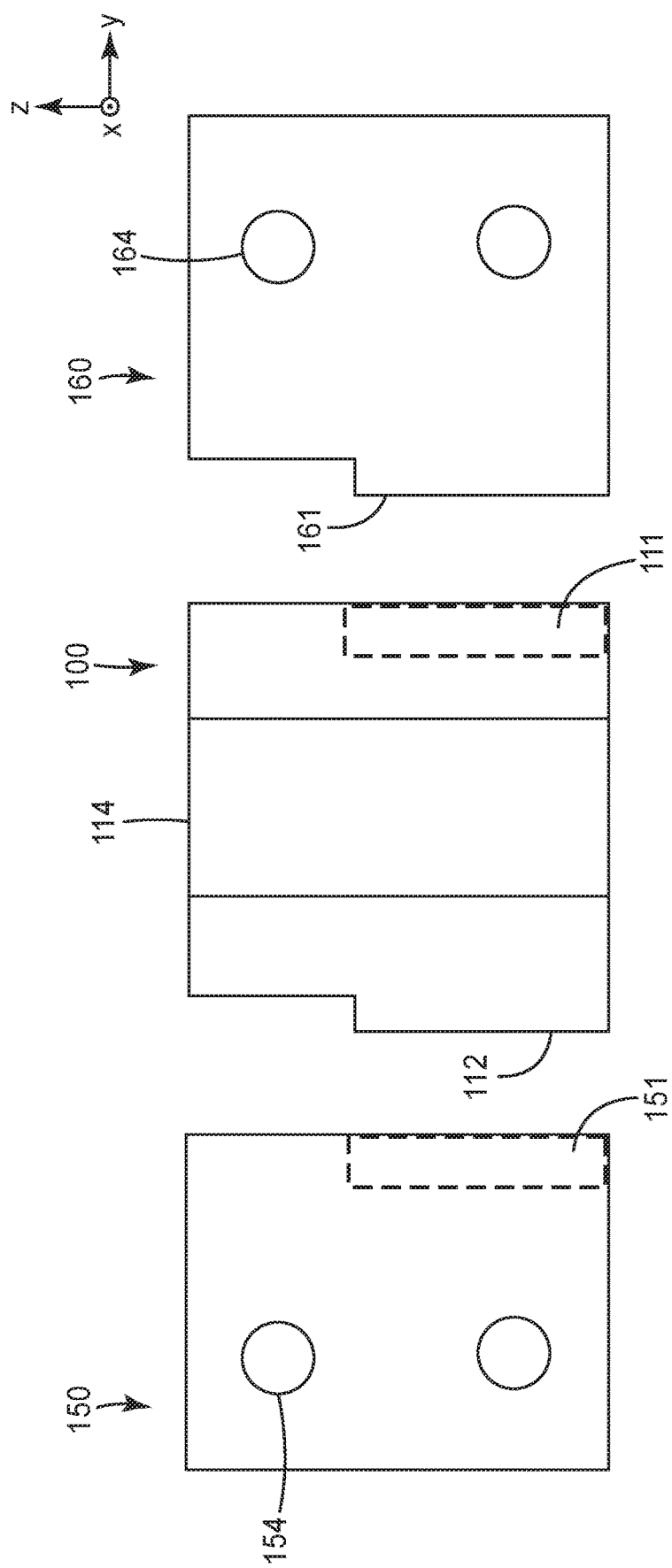

FIGS. 1A and 1B illustrate an optical ferrule support module 100 for a modular optical connector in accordance with some embodiments. The optical ferrule support module 100 can be coupled or interlocked with other optical ferrule support modules to form the modular optical connector. FIG. 1A is an exploded view looking into the interior volume 101 of the support module 100 along the x-axis. FIG. 1B is an exploded bottom view showing the ferrule support module 100 and module mounts 150, 160.

The interior volume 101 of the ferrule support module 100 is dimensioned to receive one or more optical cable subassemblies (not shown in FIGS. 1A and 1B), each optical subassembly comprising an optical ferrule attached to an optical waveguide at a ferrule attachment area. The ferrule support module 100 includes one or more passageways, e.g., curved passageways, and/or other features that support the optical cable subassemblies.

As shown in FIGS. 1A and 1B, the ferrule support module 100 includes module connecting features 111, 112, 113, 114 configured to engage with compatible module connecting features of a neighboring ferrule support module (not shown in FIGS. 1A and 1B) or with compatible module connecting features 151, 161 of connector mounts 150, 160. The module connecting features 111, 112, 113, 114 may optionally be disposed at the exterior of one, two or more of the right 100d, left 100c, bottom 100b, and top 100a sidewalls of the ferrule support module 100. For example, the module connecting features may be disposed on the exterior of two parallel sidewalls, e.g., left and right sidewalls or top and bottom sidewalls. In some embodiments, the module connecting features may be disposed on at least two adjacent sides and/or or at least two non-parallel sides.

As shown, the module connecting features 111, 112, 113, 114 are interlocking dovetail features, although it will be appreciated that many other types of mechanical features, e.g., pins and sockets, grooves, etc. could be used to interconnect the ferrule support modules. Additionally, or alternatively, features other than mechanical interlocking features, e.g., adhesive features, magnetic features, bolts or rivets, etc., could be used to connect the ferrule support modules 100 together and/or to connect the ferrule support modules 100 to the connector mounts 150, 160. FIG. 1A illustrates the module connecting features comprising interlocking dovetail features including top projection 114 at the top side 100a of the ferrule support module 100, a bottom recess 113 at the bottom side 100b of the ferrule support module 100, a left side pin 112 at the left side 100c of the ferrule support module 100, and a right side tail 111 at the right side 100d of the ferrule support module 100.

In some applications, it is useful to mount the modular optical connector to a substrate such as a circuit board and/or backplane. In these applications, optical ferrule support modules 100 may be disposed between connector mounts 150, 160 that include flanges 153, 163 with holes 154, 164 for insertion of screws or other fasteners to attach the connector mounts 150, 160 to the substrate (not shown).

Figure 2:
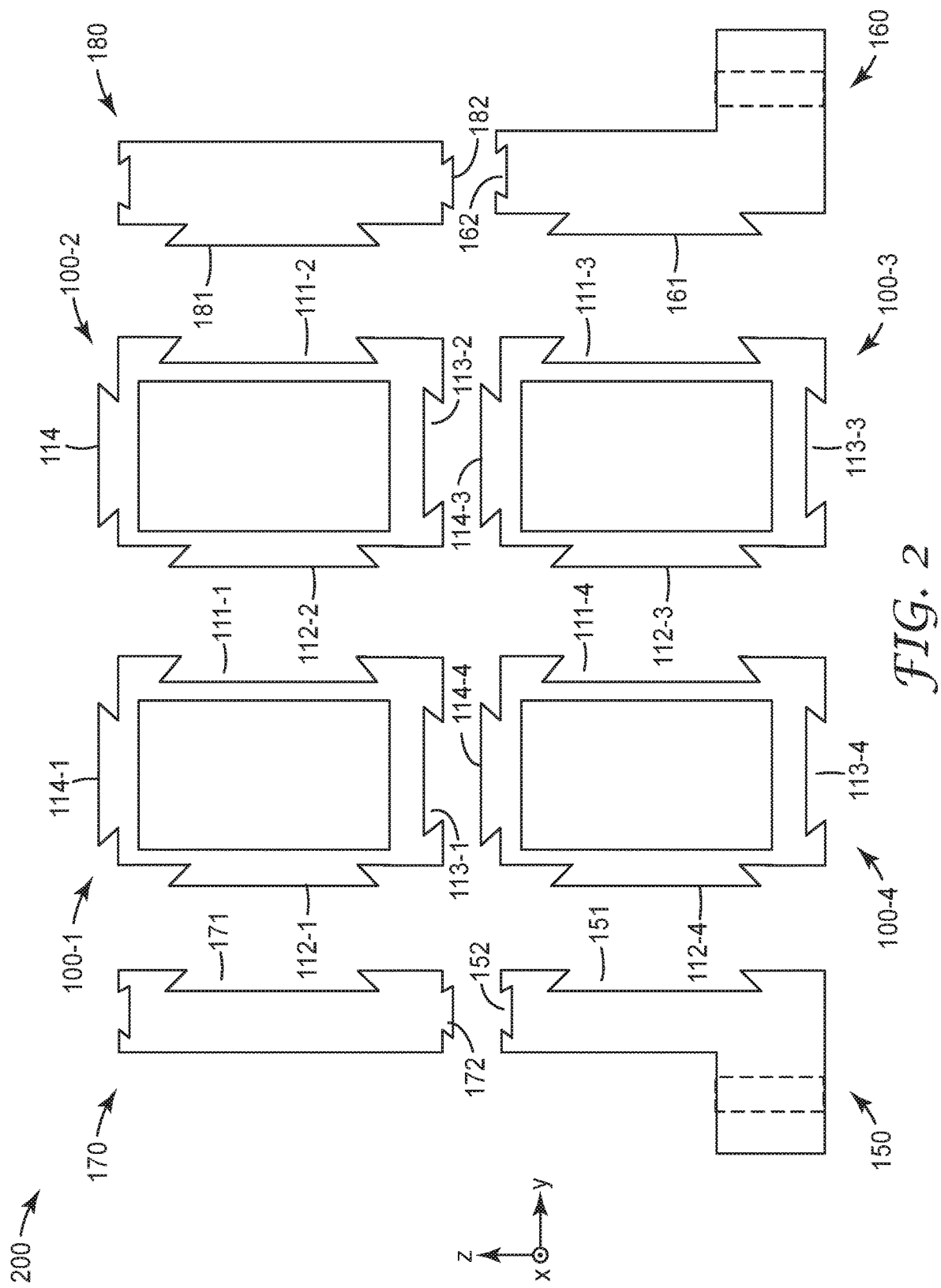
FIG. 2 depicts an assembled modular optical connector having optical ferrule support modules stacked along two perpendicular axes in accordance with some embodiments.

As illustrated in FIG. 2, an assembled modular optical connector 200 may include multiple optical ferrule support modules 100-1-100-4 that are stacked along two perpendicular axes, e.g., vertically and/or horizontally as shown in FIG. 2. Each ferrule support module 100-1, 100-2, 100-3, 100-4 is mechanically coupled by module connecting features 111-114 to at least one neighboring ferrule support module. For example, in the illustrated embodiment, module 100-1 is mechanically coupled to horizontal neighbor 100-2 and vertical neighbor 100-4; module 100-2 is mechanically coupled to horizontal neighbor 100-1 and vertical neighbor 100-3, etc. The top 114 and bottom 113 module connecting features facilitate stacking the optical modules 100-1-100-4 vertically along the z-axis as shown in FIG. 2. Right side 111 and left side 112 module connecting features facilitate stacking the optical modules 100-1-100-4 horizontally along the y-axis.

The assembled modular connector 200 includes connector mounts 150, 160 that include module connecting features 151, 152, 161, 162. Connector mount 150 is mechanically coupled to ferrule support module 100-4 by module connecting features 112-4 and 151; connector mount 160 is mechanically coupled to ferrule support module 100-3 by module connecting features 111-3 and 161. The assembled modular connector 200 may optionally include connector mounts 170, 180 without flanges. Non-flanged connector mount 170 includes module connecting feature 171 and mount connecting feature 172. Non-flanged connector mount 180 includes module connecting feature 181 and mount connecting feature 182. Engagement of feature 112-1 of module 100-1 and feature 171 mechanically couples the non-flanged connector mount 170 to ferrule support module 100-1. Engagement of feature 152 and feature 172 mechanically couple non-flanged connector mount 170 to flanged connector mount 150. Features 111-2 and 181 mechanically couple the connector mount 180 to ferrule support module 100-2. Features 162 and 182 mechanically couple non-flanged connector mount 180 to flanged connector mount 160. The assembled modular connector may optionally include a top piece (not shown) that extends between connector mount 170 and connector mount 180.

Figure 3A:
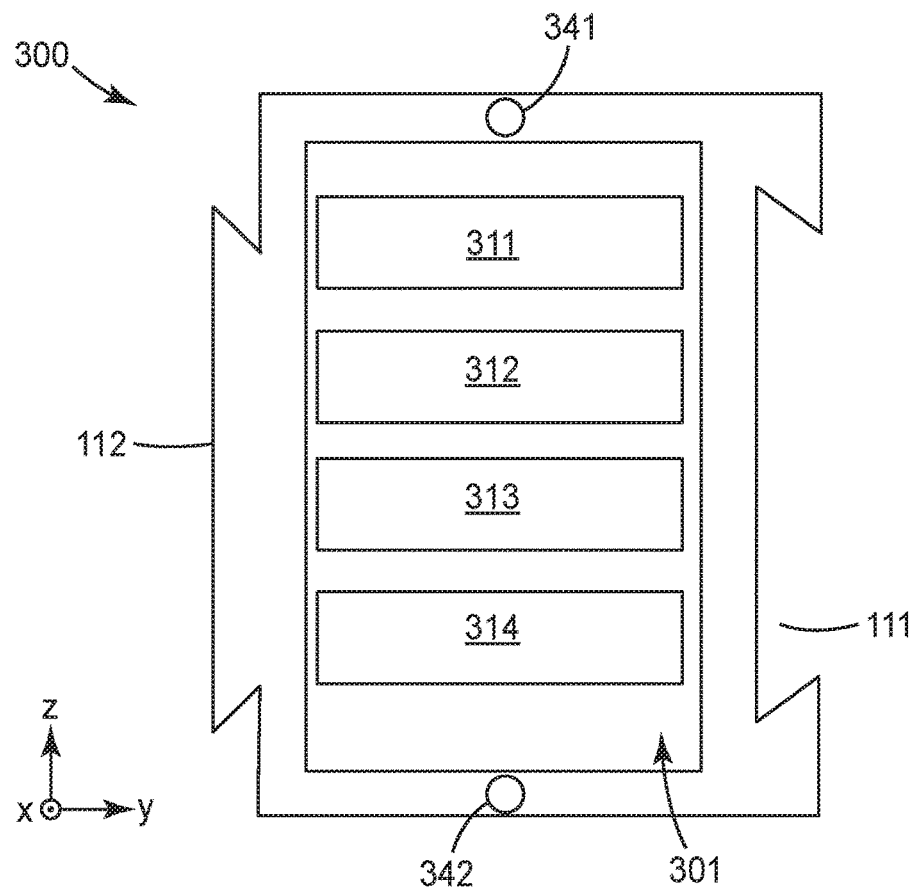
FIG. 3A shows an optical ferrule support module from the perspective of looking into the interior volume along the mating axis.
Figure 3B:
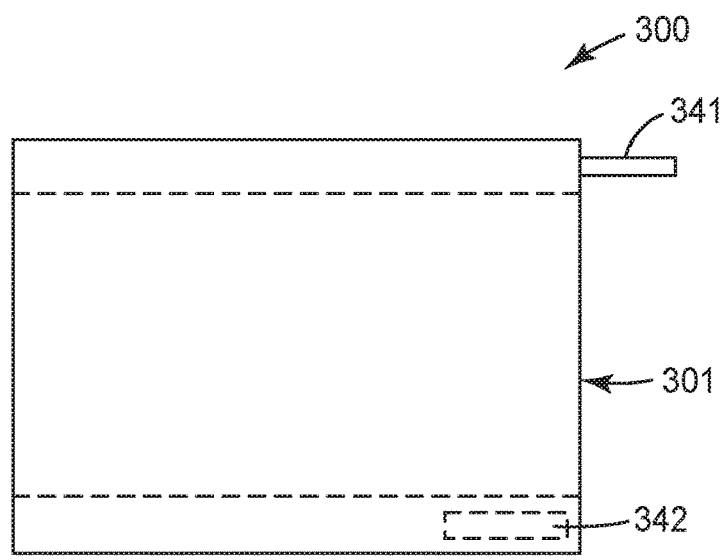
FIG. 3B shows a side view of the optical ferrule support module of FIG. 3A.

FIG. 3A shows an optical ferrule support module 300 from the perspective of looking into the interior volume 301 along the mating axis (the x axis as shown in FIG. 3A). FIG. 3B is a side view of the optical ferrule support module 300. The ferrule support module 300 is configured to provide support for the optical cable subassemblies comprising optical ferrules 311-314 that are disposed within the interior 301 of the ferrule support module 300. For example, in some embodiments, the ferrule support module 300 may include support structures and/or attachment points for the ferrules and/or the waveguides attached to the ferrules. Optical ferrules 311, 312, 313, 314 are configured to be disposed within the interior volume 301 of the ferrule support module 300 in such a way that the ferrules are able to rotate collectively or independently around the lateral axis (y-axis) of the ferrule support module 300. In some embodiments, the ferrules move rotationally around the y-axis and translationally (e.g., along the x axis) collectively or independently. Optionally, the ferrule support module 300 may include one or more rough alignment features, such as a pin 341 and a socket 342 as shown. The rough alignment pin 341 and socket 342 are compatible with a socket and pin of a mating optical ferrule support module. Engagement of pin 341 with a socket of the mating module and engagement of socket 342 with a pin of the mating module serve to provide rough alignment of the ferrule support module 300 with respect to the mating support module.

Figure 4A:
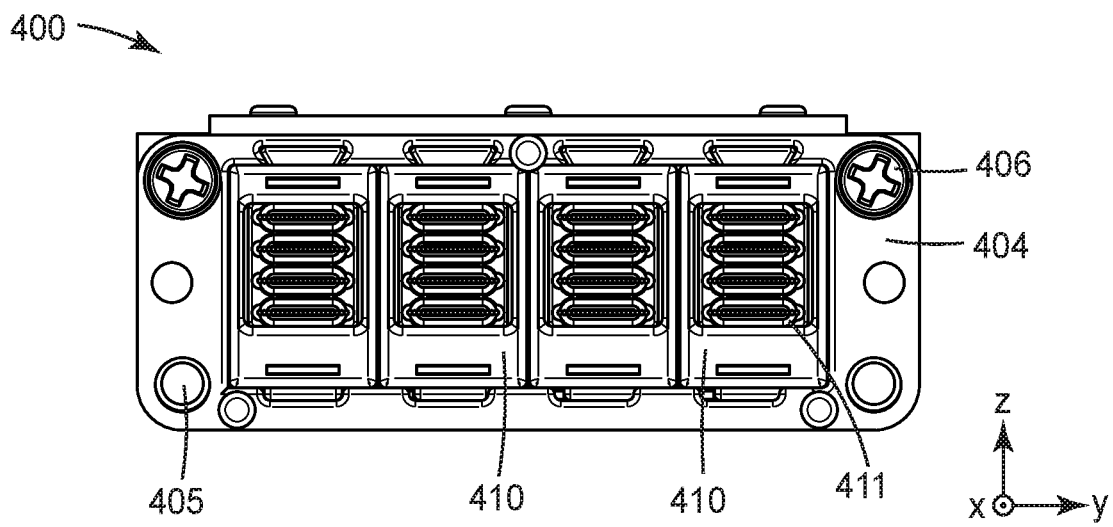
FIGS. 4A through 4D show optical ferrule support modules that are held in proximity to one another by a frame.
Figure 4B:
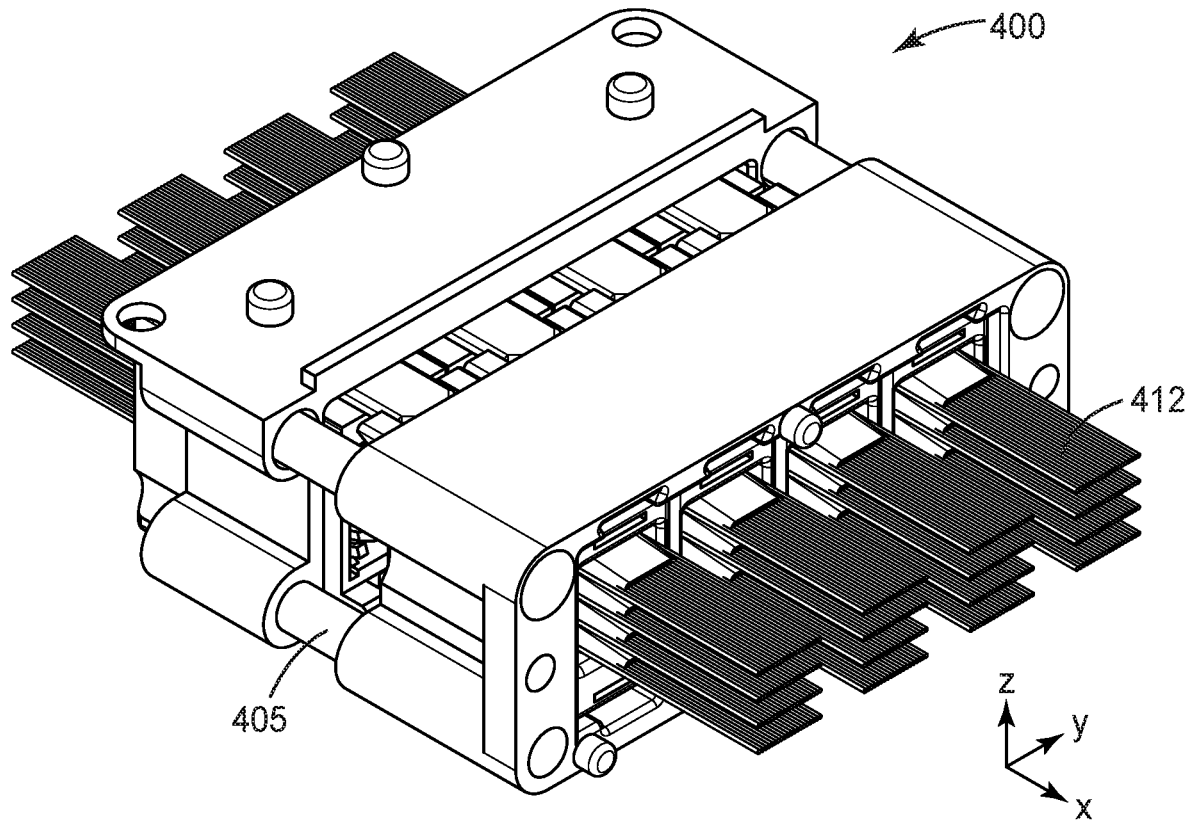
Figure 4C:
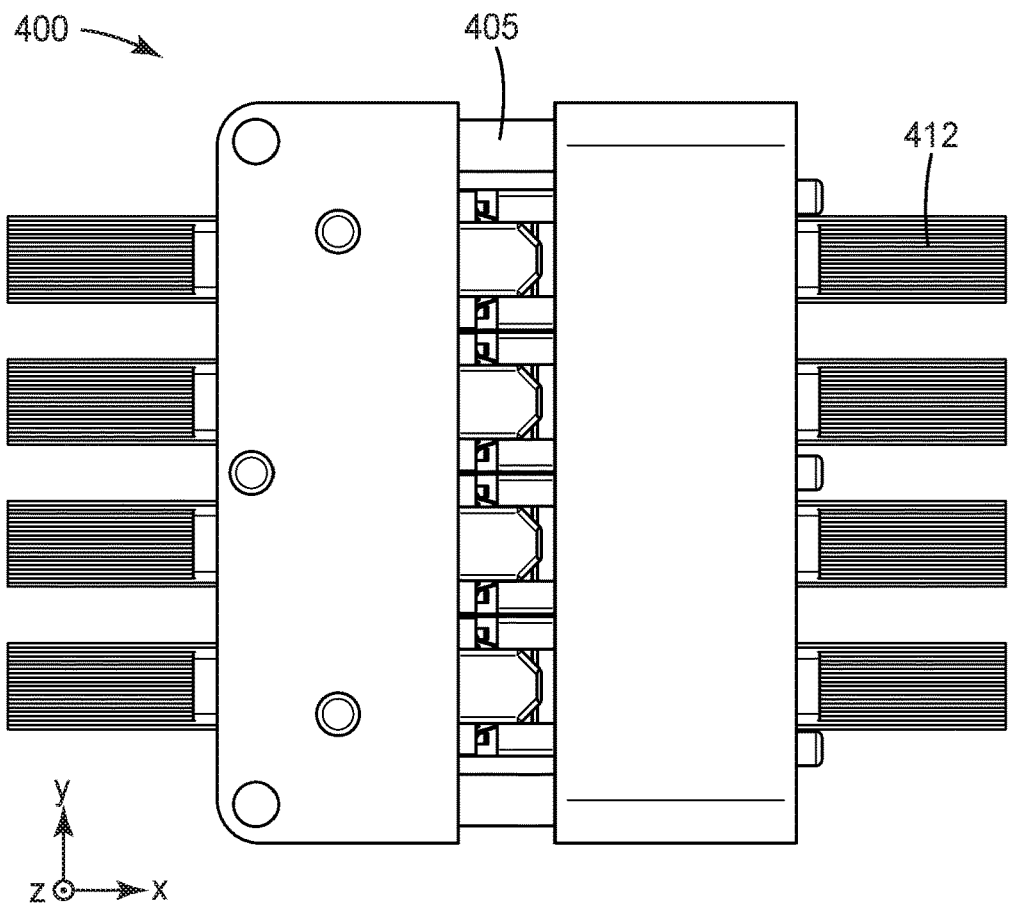
Figure 4D:
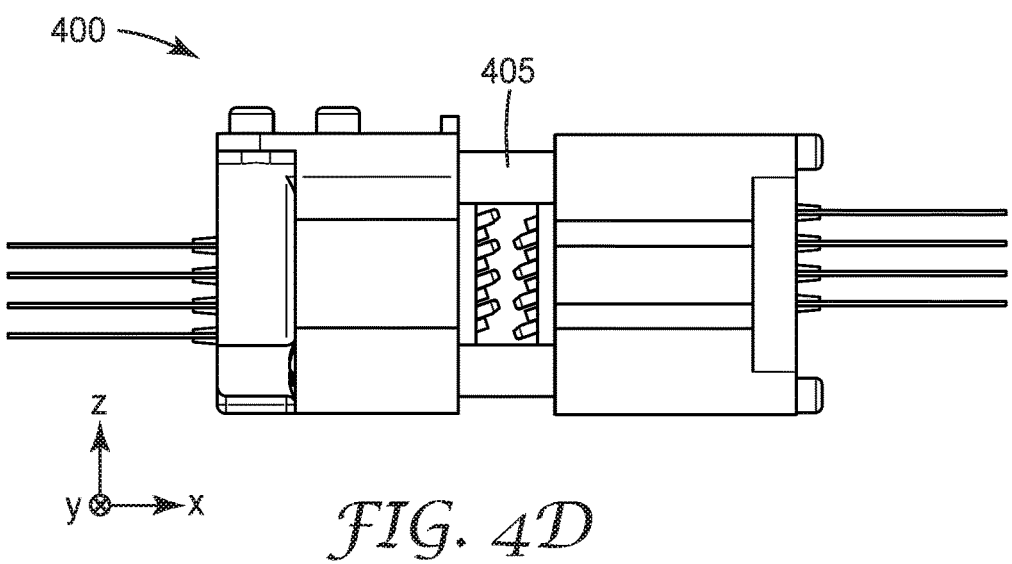

In some embodiments, the ferrule support modules need not have interlocking module connecting features as described above The ferrule support modules are held in proximity to one another in a horizontally or vertically stacked orientation by a frame, as shown in FIGS. 4A through 4D. FIG. 4A is a view looking into a modular optical connector 400; FIGS. 4B, 4C, and 4D are, respectively, perspective, top, and side views of the modular connector 400. Modular optical connector 400 includes four ferrule support modules 410 held in a stacked orientation by frame 402. Each ferrule support module 410 has an interior volume with four optical ferrules 411 disposed within the interior volume of the support module 410. Each support module includes support features that hold the optical cable subassemblies, e.g., ferrules 411 and/or waveguides 412. For example, the support features may hold the ferrules 411 in fixed, floating, or semi-floating positions.

The frame 402 includes rough alignment features, e.g., sockets 406 and pins 405 that are arranged along the mating (x-) direction.

Figure 5A:
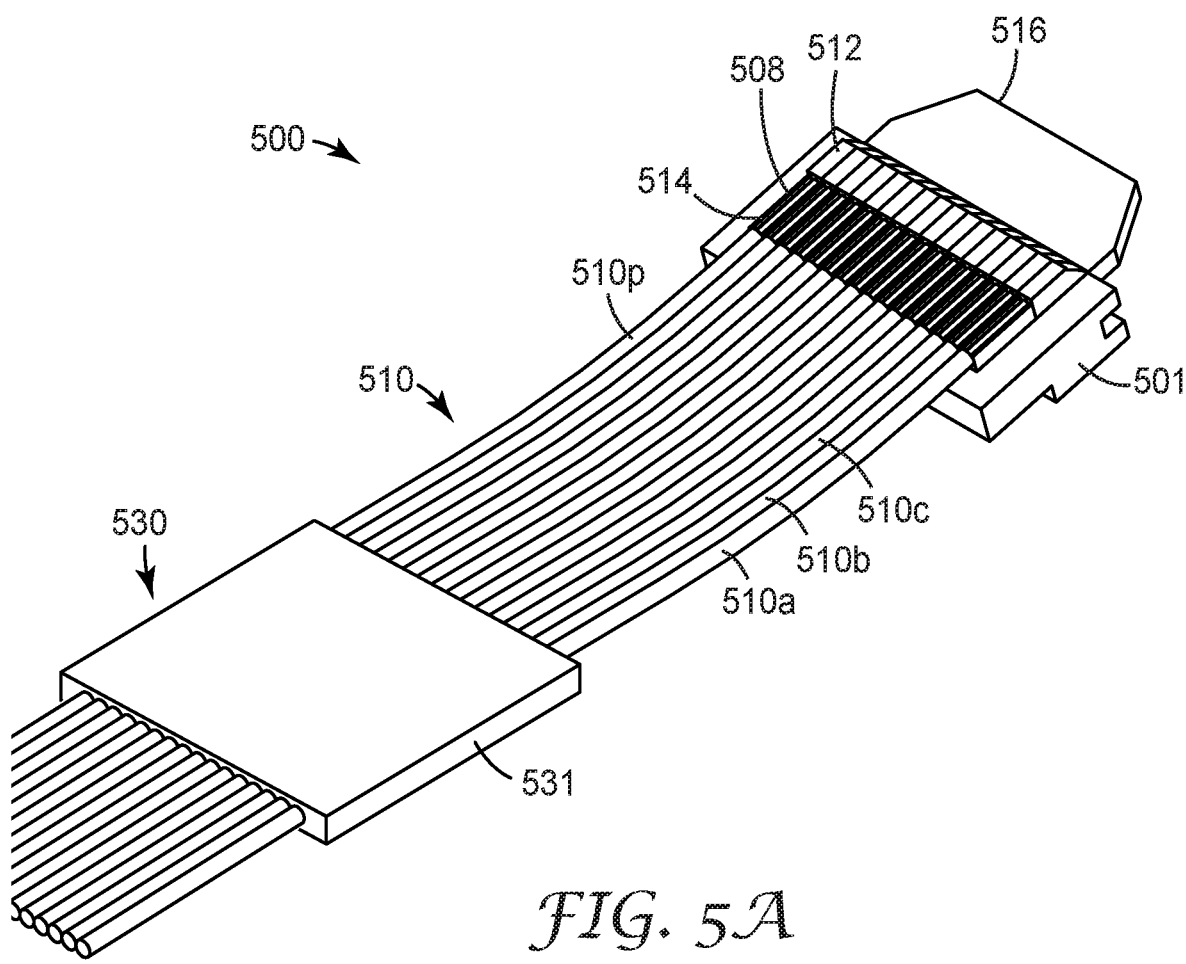
FIG. 5A provides a perspective view of an optical cable subassembly suitable for installation within the interior volume of an optical ferrule support module in accordance with some embodiments.

FIG. 5A provides a perspective view of an optical cable subassembly 500 suitable for installation within the interior volume of an optical ferrule support module as described herein. The optical cable subassembly 500 comprises an expanded beam optical ferrule 501 attached to at least one optical waveguide 510. Although FIG. 5A illustrates an optical ferrule 501 attached to an array 510 of individual waveguides 510a-510p, it will be appreciated that in some embodiments, the optical ferrule is configured to be attached to a single optical waveguide. An optical waveguide may be any optical element that can carry an optical signal, e.g., polymer waveguide, fiber waveguide, single core waveguide, multi-core waveguide, single- or multi-mode waveguide, and may have any suitable cross sectional shape, e.g., square, round, etc. In some embodiments, as discussed in greater detail below, the optical cable subassembly 500 includes a cable retainer 530 that is spaced apart from the optical ferrule 501 and is attached to the optical waveguides 510. The optical waveguides 510a, b, c are permanently attached to the optical ferrule 501 at a ferrule attachment area 508. In embodiments that include a cable retainer 530, the optical waveguides 510 are attached to the cable retainer 530 at the retainer attachment area 531.

The optical ferrule 501 is configured to mate, e.g., hermaphroditically, with another optical ferrule (not shown in FIG. 5A). The optical ferrule 501 illustrated in FIG. 5A includes a mechanical mating tongue 516 and light redirecting member 512. In some embodiments, the mechanical mating tongue 516 can have a tapering width along at least a portion of a length of the tongue portion as shown in the illustrations. In some configurations, the mechanical mating tongue 516 can extend outwardly from the front of the ferrule support module (not shown in FIG. 5A).

The ferrule attachment area 508 includes a plurality of grooves 514, each groove being configured to accommodate a different optical waveguide 510a-510p. The grooves 514 are configured to receive an optical waveguide 510a-510p and each optical waveguide 510a-510p is permanently attached to a respective groove 514 at the ferrule attachment area 508, e.g., using an adhesive.

Figure 5B:
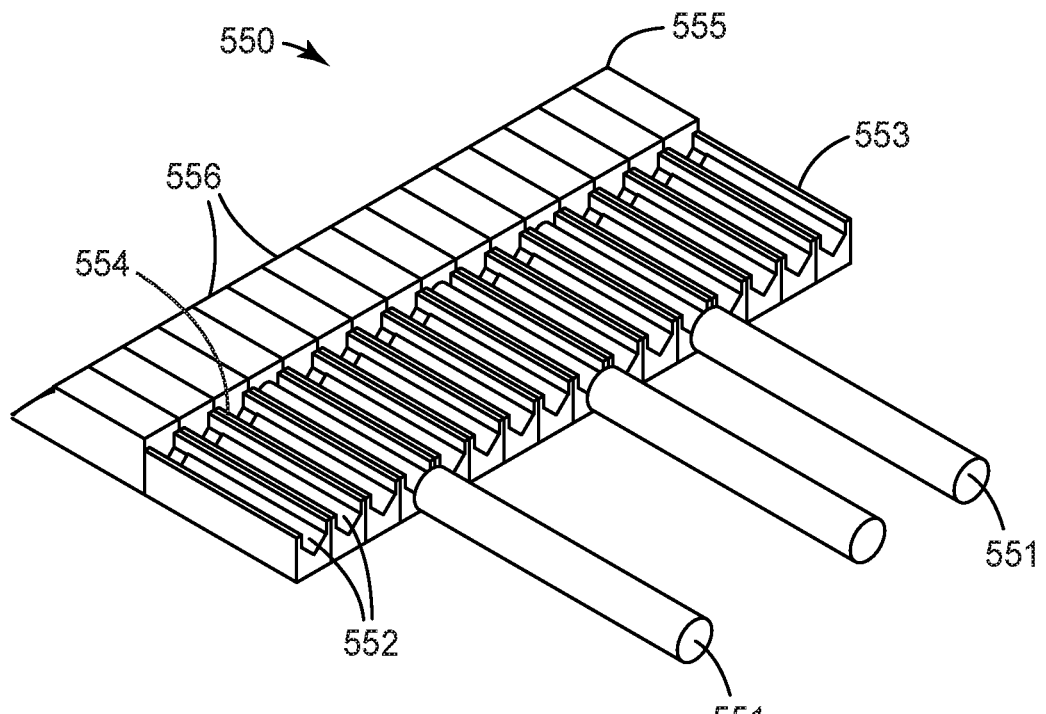
FIGS. 5B and 5C are cutaway views of portions of optical ferrules focusing on the light redirecting portions of the optical ferrules.
Figure 5C:
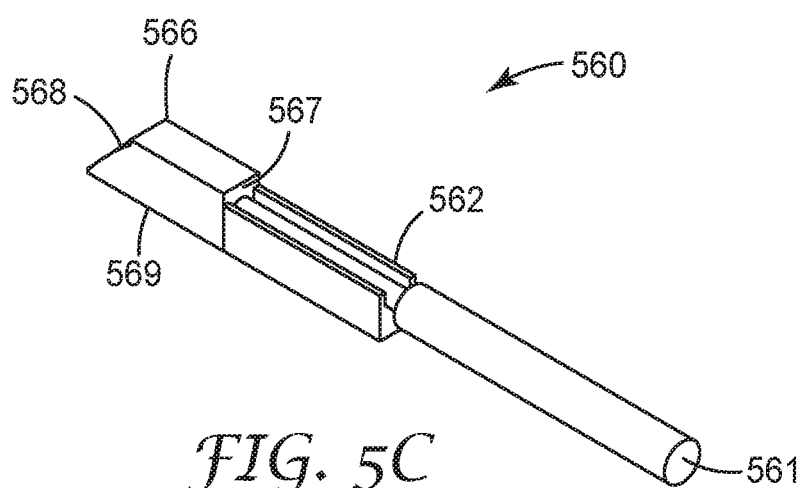

FIGS. 5B and 5C are cutaway views of portions of optical ferrules 550, 560 focusing on the light redirecting portions of the optical ferrules 550, 560. FIG. 5B illustrates the attachment of several optical waveguides 551 to the optical ferrule 550. Optical waveguides 551 are aligned in grooves 552 to which they are permanently attached at the ferrule attachment area 553. The exit ends 554 of optical waveguides 551 are situated so as to be able to direct light emanating from the optical waveguides 551 into the input side or face of light redirecting member 555. Light redirecting member 555 includes an array of light redirecting elements 556, at least one for each optical waveguide 551 attached to ferrule 550. For example, in various embodiments each light redirecting element 556 comprises one or more of a prism, a lens, and a reflecting surface.

FIG. 5C is a cutaway view of a portion of an optical ferrule 560 that includes a single light redirecting element 566, one waveguide alignment member, e.g., groove 562, and one optical waveguide 561. In this illustration, optical waveguide 561 is aligned in groove 562 and may be permanently attached to it. At the point of attachment, the fiber buffer coating and protective jacket (if any) have been stripped away to allow only the bare optical waveguide (core and cladding) to lie aligned and permanently affixed to groove 562. Light redirecting element 566 includes light input side 567 for receiving input light from the optical waveguide (e.g., optical fiber) 561 disposed and aligned at the waveguide alignment member 562. Light redirecting element 566 also includes light redirecting side 568 that may include a curved surface for receiving light from the input side 567 along an input direction and redirecting the received light along a different redirected direction. The light redirecting element 566 also includes output surface or window 569 that receives light from light redirecting side 568 of light redirecting element 566 and transmits the received light as output light along an output direction toward a light redirecting member of a mating light coupling unit.

FIGS. 6A through 6C are a sequence of side view illustrations that depict two expanded beam optical ferrules before (FIG. 6A) during (FIG. 6B) and after (FIG. 6C) mating. The optical ferrules 610, 620 are attached to optical waveguides 611, 621 at ferrule attachment areas 613, 623. A cable retainer (not shown) may be optionally attached to the optical waveguides 611, 621, at a retainer attachment area. During mating, the mating surfaces 610a, 620a of the ferrules 610, 620 slide against each other. As the ferrules 610, 620 mate, they orient at a predetermined mating angle, θ, with respect to a mating axis (x axis) of the modular connector. Rotation of the optical ferrules 610, 620 facilitates the development of a bend 612, 622 in the optical waveguides 611, 621 between the ferrule attachment area 613, 623 and a second attachment area of the optical waveguides (which may be a retainer attachment area or other attachment area) in the ferrule support module. The bend 612, 622 provides a predetermined amount of spring force to maintain the optical ferrules 610, 620 in the mated position. Dashed line 699 shows the path of light carried by optical waveguide 611, to light redirecting element 641 of optical ferrule 610, through the output window of optical ferrule 610 to light redirecting element 651 of optical ferrule 620, and to optical waveguide 621.

Additional information regarding features and operation of optical ferrules, optical cable subassemblies and optical connectors is discussed in commonly owned U.S. Patent Application 61/710,077 filed on Oct. 5, 2012 which is incorporated herein by reference in its entirety.

Figure 6D:
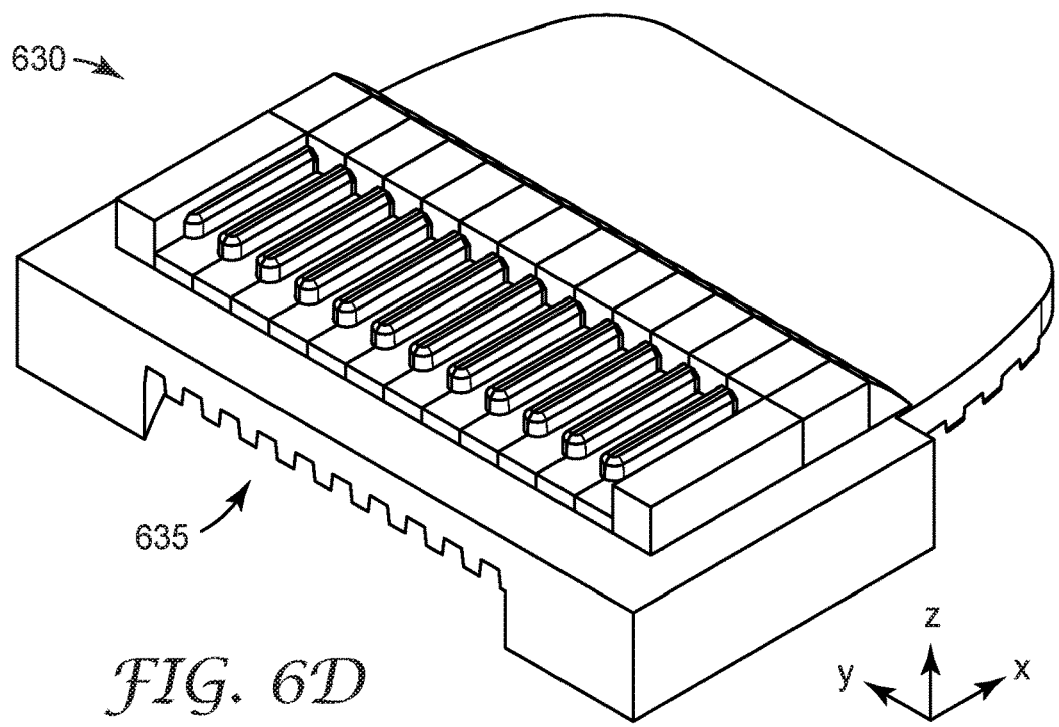
FIGS. 6D and 6E illustrate top and bottom views, respectively, of an optical ferrule having dust mitigation grooves on its mating surface in accordance with some embodiments.
Figure 6E:
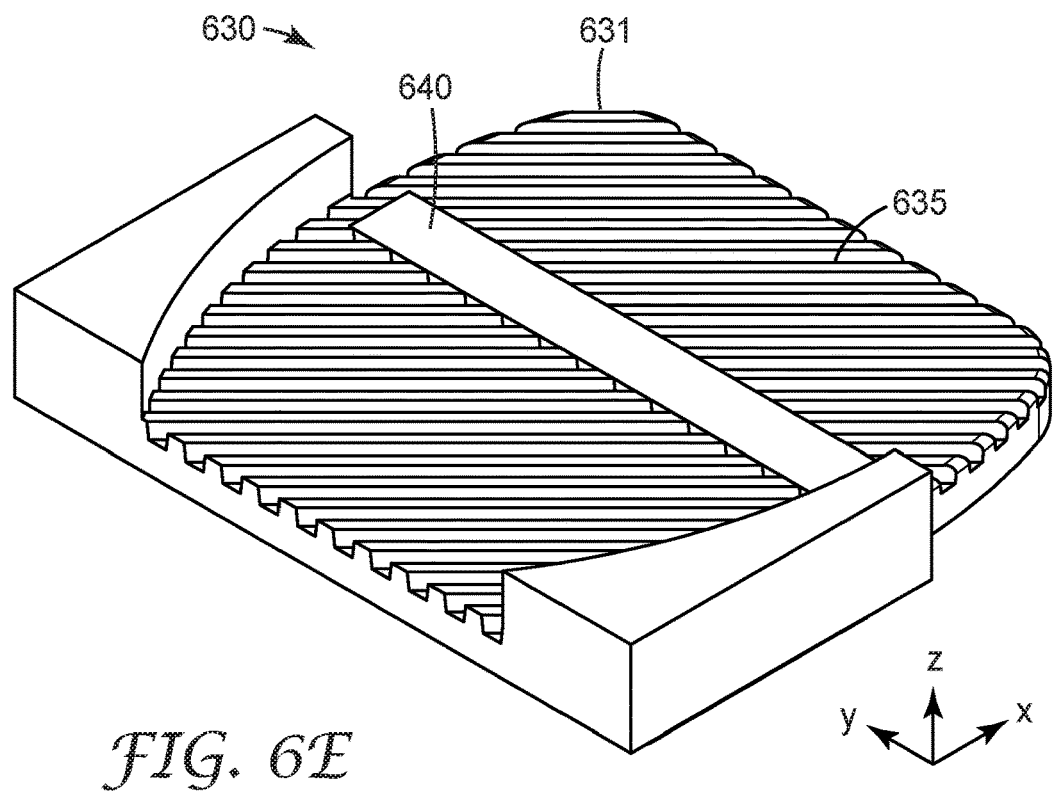

Expanded-beam optical ferrules can be sensitive to small angular errors, e.g., on the order of about 0.1 degrees. Dust particles trapped between the mating surfaces of optical ferrules can cause angular misalignment thereby decreasing optical transmission efficiency. In some embodiments, the mating surface of an optical ferrule incorporates a series of features, e.g., grooves, posts or other features or patterns, configured to capture particulate contaminates, such as dust, when the mating surface of the optical ferrule contacts a corresponding mating surface of a mating ferrule. FIGS. 6D and 6E illustrate top and bottom views, respectively, of an optical ferrule 630 having dust mitigation grooves 635 on its mating surface in accordance with some embodiments. The grooves 635 are configured and arranged to trap particulate contaminates as the mating surface 631 of the optical ferrule 630 slides over the mating surface of a mating ferrule. The mating surface 631 of the optical ferrule 630 includes an optical output window 640 which extends along the lateral (y-) axis of the ferrule 630 and transmits light from the optical ferrule 630 to a mating ferrule. The grooves 635 (or other dust mitigation features) may be located on one or both sides of the output window 640. As shown, the grooves 635 are oriented at an angle of about 45° with respect to the lateral axis (y axis) of the ferrule.

Additional information regarding dust mitigation features for optical ferrules is provided in commonly owned and concurrently filed U.S. Patent Application titled "Dust Mitigating Optical Connector," and identified by U.S. patent application provisional No. 62/240,000, which is incorporated herein by reference in its entirety.

Figure 7A:
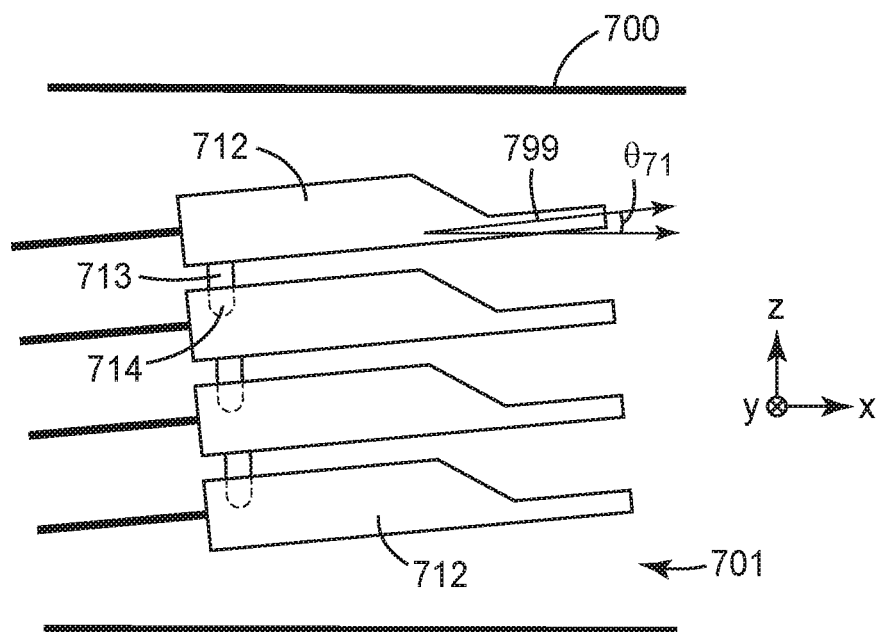
FIGS. 7A and 7B provide an example of non-independent rotation of the optical ferrules within the interior of the support module where the ferrule support module itself does not rotate.
Figure 7B:
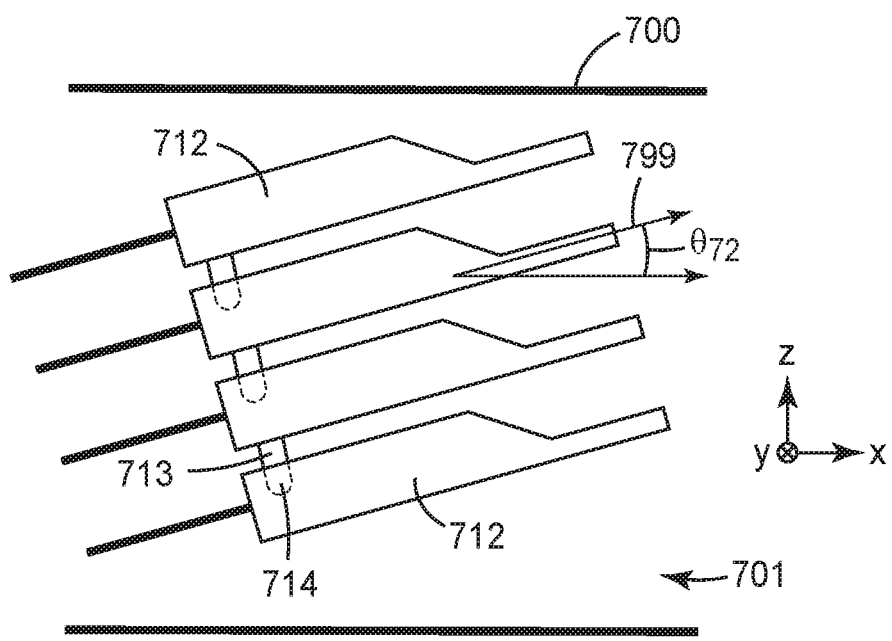

Optical ferrules disposed within the interior of a ferrule support module may rotate independently or together (non-independently) around the lateral axis of the ferrule support module. FIGS. 7A and 7B provide an example of non-independent rotation of the optical ferrules 712 within the interior 701 of the support module 700 where the ferrule support module 700 itself does not rotate. In this example, the optical ferrules 712 are mechanically coupled together by ferrule coupling features exemplified by a tab 713 inserted into a slot 714 of an adjacent ferrule 712. The ferrule coupling features 713, 714 ensure that the ferrules 712 rotate collectively and non-independently around the y axis. FIGS. 7A and 7B respectively show the optical ferrules 712 rotated around the y axis so that the longitudinal axis 799 of the optical ferrules 712 makes an angle $\theta_{71}$ (FIG. 7A) and an angle $\theta_{72}$ (FIG. 7B) with respect to the mating axis, x, of the ferrule support modular 700.

Figure 8:
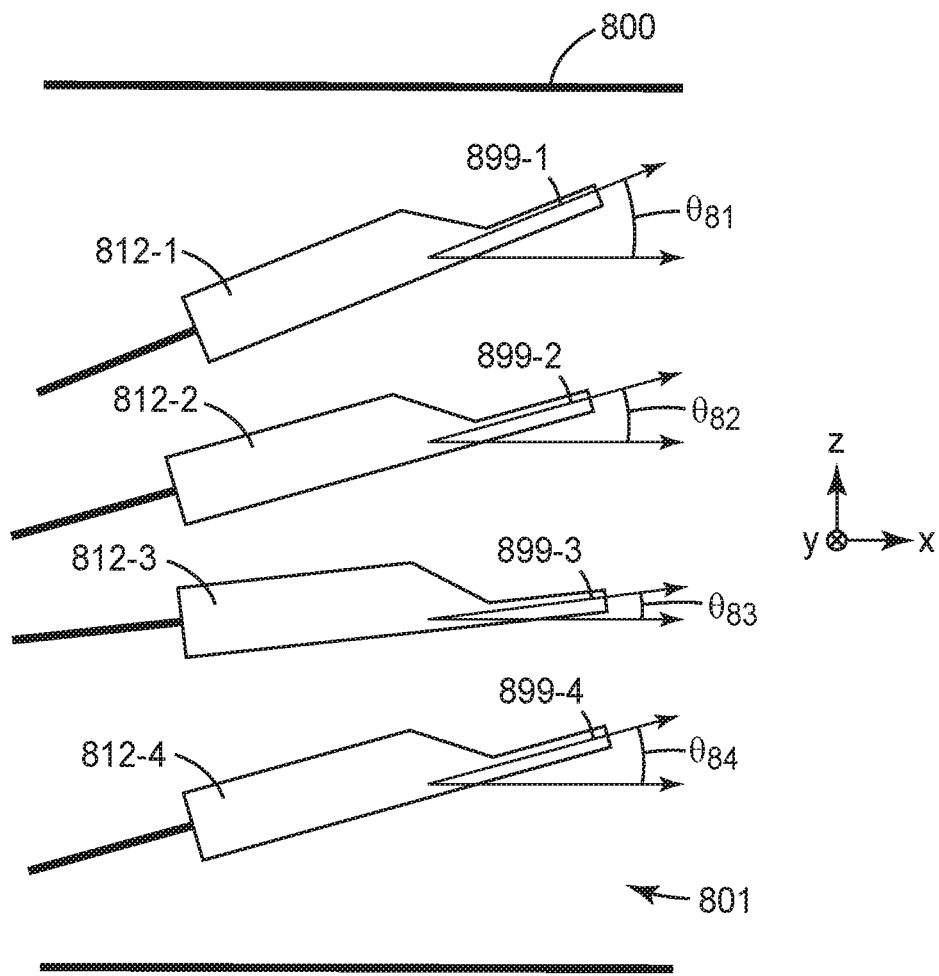
FIG. 8 illustrates independent rotation of optical ferrules according to some embodiments.

FIG. 8 illustrates independent rotation of the optical ferrules 812-1, 812-2, 812-3, 812-4. FIG. 8 provides an example of independent rotation of the optical ferrules 812-1, 812-2, 812-3, 812-4 within the interior 801 of the support module 800 where the module 800 itself is held fixed and does not rotate. Each optical ferrule 812-1, 812-2, 812-3, 812-4 is configured to rotate around the y axis independently from the rotation of any other ferrules 812-1, 812-2, 812-3, 812-4. In FIG. 8, optical ferrule 812-1 is shown rotated around the y axis such that the longitudinal axis 899-1 of optical ferrule 812-1 makes an angle $\theta_{81}$ with respect to the mating axis, x, of the support module 800; optical ferrule 812-2 is shown rotated around the y axis such that the longitudinal axis 899-2 of optical ferrule 812-2 makes an angle $\theta_{82}$ with respect to the mating axis, x, of the support module 800; optical ferrule 812-3 is shown rotated around the y axis such that the longitudinal axis 899-3 of optical ferrule 812-3 makes an angle $\theta_{83}$ with respect to the mating axis, x, of the support module 800; and optical ferrule 812-4 is shown rotated around the y axis such that the longitudinal axis 899-4 of optical ferrule 812-4 makes an angle $\theta_{84}$ with respect to the mating axis, x, of the support module 800. In this particular example $\theta_{81} \neq \theta_{82} \neq \theta_{83} \neq \theta_{84}$.

Figure 9A:
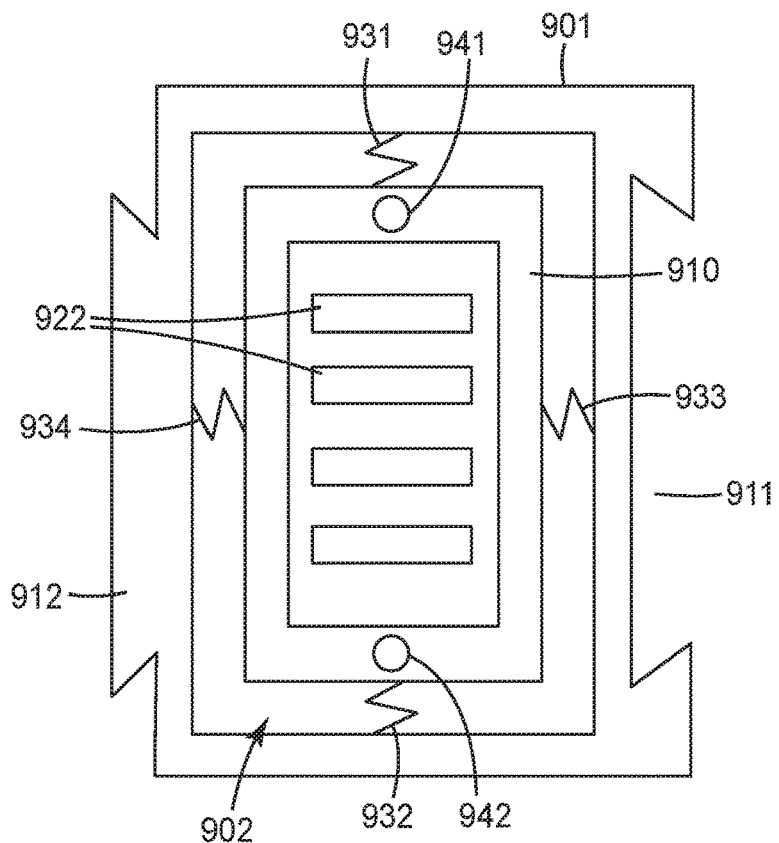
FIGS. 9A and 9B show an optical ferrule support module that comprises an inner floating support structure in accordance with some embodiments.
Figure 9B:
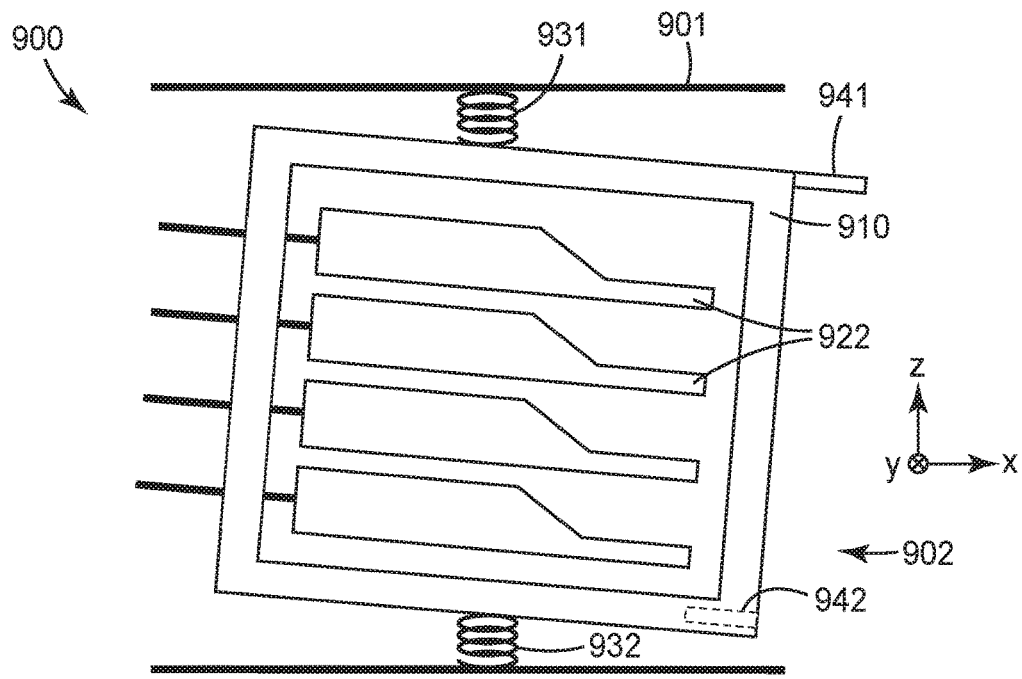

FIGS. 9A and 9B show an optical ferrule support module 901 that comprises an inner floating support structure 910 with optical ferrules 922 positioned within the inner floating support structure 910. The inner floating support structure 910 may be held within the interior 902 of the optical ferrule support module 901 by springs or other compliant features 931-934 that allow some amount of translation along and/or rotation around x, y, and/or z axes. The inner support structure 910 can be coupled to an interior of the sidewalls of the optical ferrule support module by compliant features 931-934. FIG. 9A shows a view looking into the interior 902 of the optical ferrule support module 901 and inner floating support 910. FIG. 9B is a cutaway side view of the ferrule support module 901.

In this example, the inner floating support 910 "floats" due to the compliant features 931, 932, 933, 934 which allow some rotation of the inner floating support around the x, y, and z axes and/or some translation along the x, y, and z axes. In this embodiment, the inner floating support 910 includes ferrule support features that support and hold the optical ferrules 922 so that the rotation and/or translation of the floating support 910 causes the ferrules 922 to move together, e.g., non-independently. For example, the ferrules 922 may rotate together and non-independently around the y axis. In some embodiments, the support features of the inner floating support 910 could alternatively be configured to allow for independent rotation and/or translation of the ferrules. In other embodiments, the inner floating support 910 can be supported by optical waveguides attached to optical ferrules 922.

The inner floating support 910 optionally includes rough alignment features, such as a pin 941 and a socket 942 configured to align the inner floating support 910 with a compatible socket and pin of a mating inner floating support of a mating ferrule support module. Alternatively or additionally, the alignment features may comprise side arms, e.g., flexible side arms, as described in connection with FIG. 10C.

The ferrule support module 901 includes module connecting features 911, 912, configured to engage with compatible module connecting features of a neighboring ferrule support module (not shown in FIGS. 9A and 9B) or with compatible module connecting features 151, 161 of one or more connector mounts 150, 160 shown in FIGS. 1A and 1B. Module connecting features 911 and 912 are shown at the left and right sides of the ferrule support module 901 in FIG. 9A. Additionally, or alternatively, module connecting features may optionally be disposed at top and bottom sides of the ferrule support module 901 to allow for two dimensional stacking of modules 901.

Figure 9C:
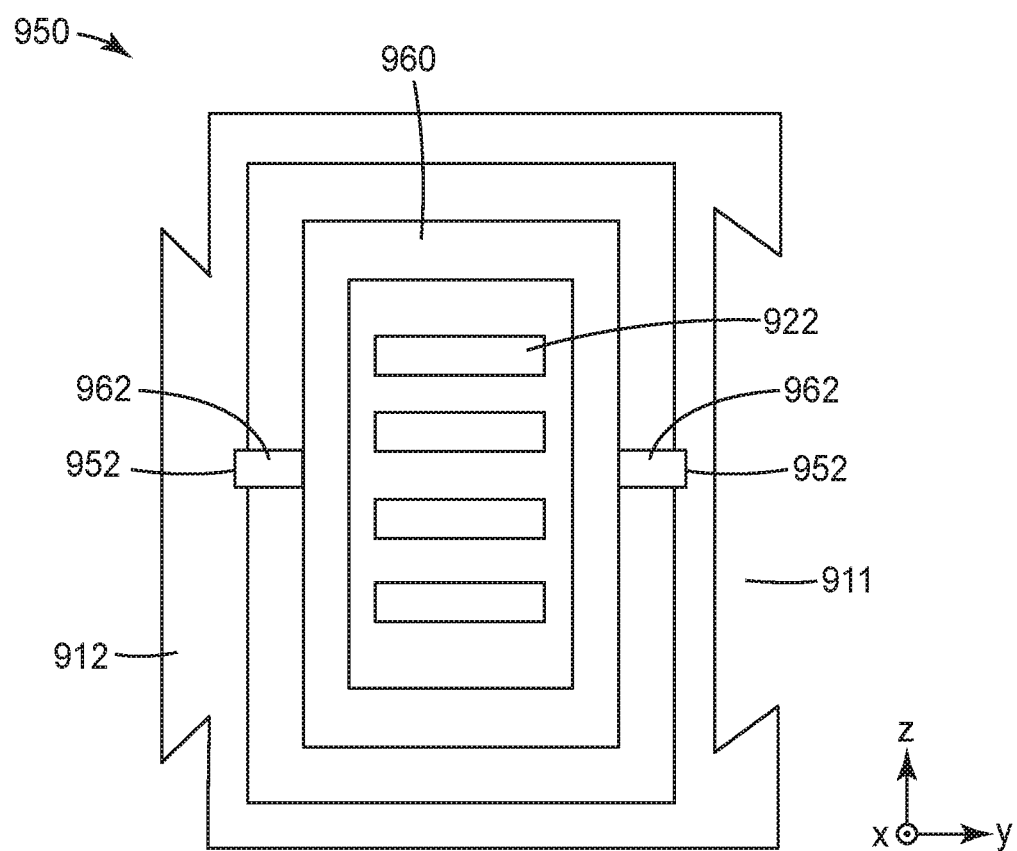
FIG. 9C shows an optical ferrule support module that includes an inner semi-floating ferrule support structure in accordance with some embodiments.

FIG. 9C shows an optical ferrule support module 950 that includes an inner ferrule support structure 960 (referred to as a "semi-floating" support structure) having limited movement when compared to the movement of the floating ferrule support structure described above. The inner ferrule support 960 includes pins 962 inserted into holes 952 in the inner walls of the ferrule support module 950. In this configuration, the semi-floating inner ferrule support 960 can rotate around the y axis, but rotation around the x and z axes and translation along the x, y, and z axes may be restricted. Alternatively, the inner walls of the ferrule support module may have slots instead of holes, wherein the slots are configured to allow for some translation of the inner ferrule support 960 along the x, y and/or z axes.

Figure 10B:
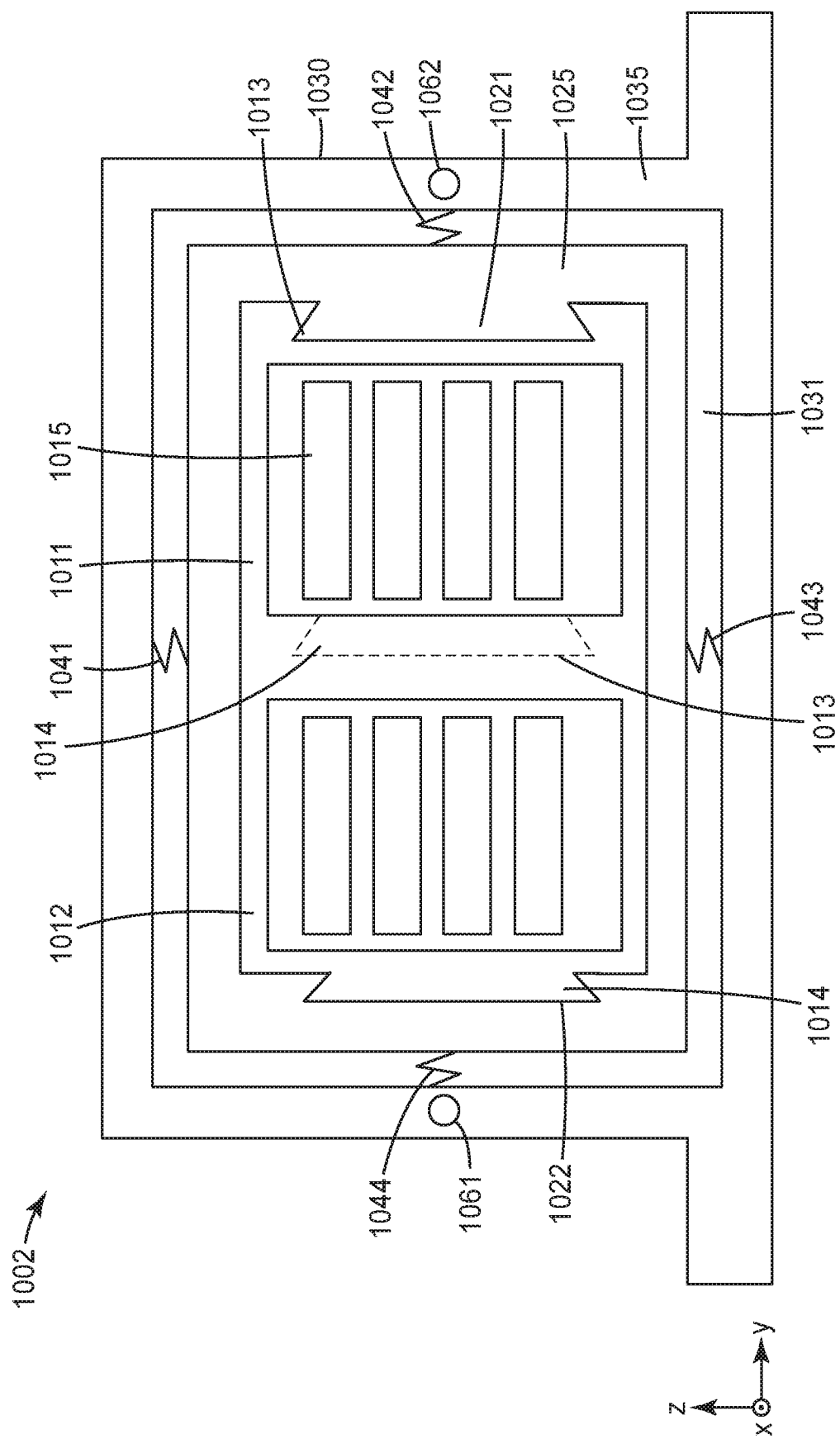

FIGS. 10A and 10B depict modular connectors 1001, 1002 in accordance with some embodiments. Modular connectors 1001, 1002 each include two interconnected ferrule support modules 1011, 1012 disposed within a floating inner frame 1020, 1025. The floating inner frame 1020, 1025 is disposed within the interior 1031 of a secondary frame 1030, 1035 of the modular connector 1001, 1002. The ferrule support modules 1011, 1012 are configured to support one or more optical ferrules 1015. Each ferrule support module 1011, 1012 includes module connecting features 1013, 1014 configured to couple to the module connecting features of a neighboring ferrule support module and/or to module connecting features 1021, 1022 of the inner frame 1020, 1025. In this particular example, each ferrule support module 1011, 1012 includes dovetail module connecting features comprising a projection 1014 and recess 1013. The inner frame 1020, 1025 includes dovetail module connecting features comprising a projection 1021 and recess 1022. It will be appreciated that many other types of mechanical features, e.g., pins and sockets, grooves, bolts or rivets, and/or non-mechanical features, e.g., adhesives and/or magnetic features, could be used to interconnect the ferrule support modules 1011, 1012 and/or to connect the ferrule support modules 1011, 1012 to the inner frame 1020, 1025.

The inner frame 1020, 1025 is held within the interior 1031 of the secondary frame 1030, 1035 by springs or other compliant features 1041-1044 that allow some amount of translation along and/or rotation around x, y, and/or z axes. Alternatively, the features 1041-1044 that hold the inner frame within the secondary frame may restrict translation along and/or rotation around some axes while allowing translation along and/or rotation around other axes.

In some embodiments, the ferrules 1015 may be held in a fixed position with respect to the inner frame 1020, 1025 such that rotation and/or translation of the inner frame 1020, 1025 causes the ferrules 1015 to move together and non-independently. Alternatively or additionally, the ferrules 1015 may be held within the ferrule support module 1011, 1012 in a way that allows for independent movement of the ferrules 1015, e.g., rotation around the y axis.

As shown in FIGS. 10A and 10B, the modular connector 1001, 1002 may include rough alignment features that compatibly engage with complementary mating alignment features. Modular connector 1001 includes alignment features 1051, 1052 located on the inner frame 1020; modular connector 1002 includes alignment features 1061, 1062 located on the secondary frame 1030. The alignment features 1051, 1052, 1061, 1062 may comprise two pins or two sockets for non-hermaphroditic embodiments, or may comprise a pin and a socket for hermaphroditic embodiments. Various other types of mechanical alignment features could alternatively be used, e.g. such as arms at the left and right or top and bottom sides of the inner frame.

Figure 10C:
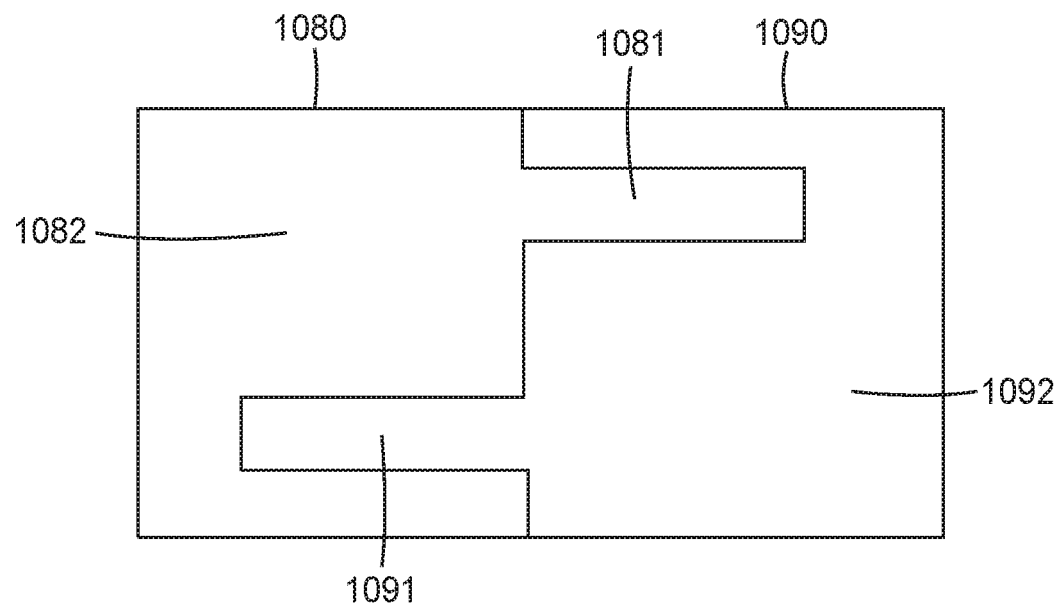
FIG. 10C shows a side schematic view of an inner frame of an optical ferrule support module mated with a mating inner frame wherein the inner frame and mating inner frame include alignment features in accordance with some embodiments.

FIG. 10C shows a side view of an inner frame 1080 mated with a mating inner frame 1090. The inner frame 1080 includes side arms 1081 that extend from the left side 1082 and right side (not shown) of the inner frame 1080 and engage with the left side (not shown) and right side 1092 of a mating inner frame 1090. Side arms 1091 extend from the left side and right side 1092 of the mating inner frame 1090 and engage with left side 1082 and right side of the inner frame 1080. In some embodiments, the side arms 1081, 1091 may be flexible.

Figure 11D:
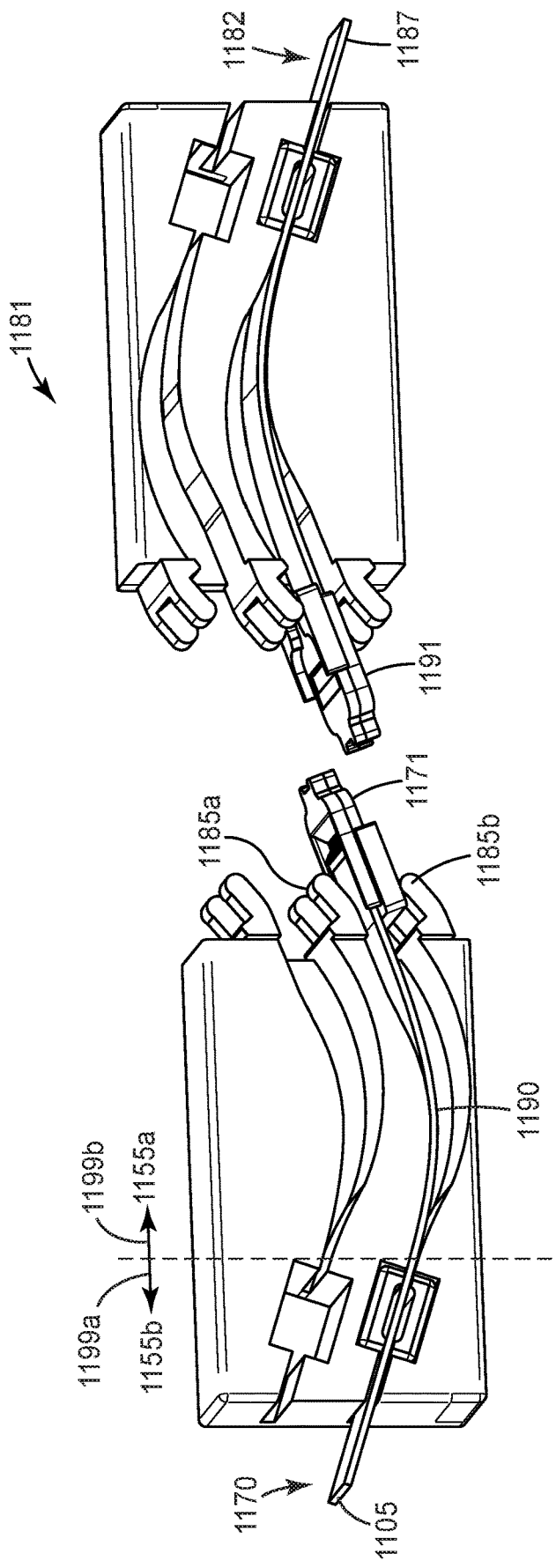
Figure 12:
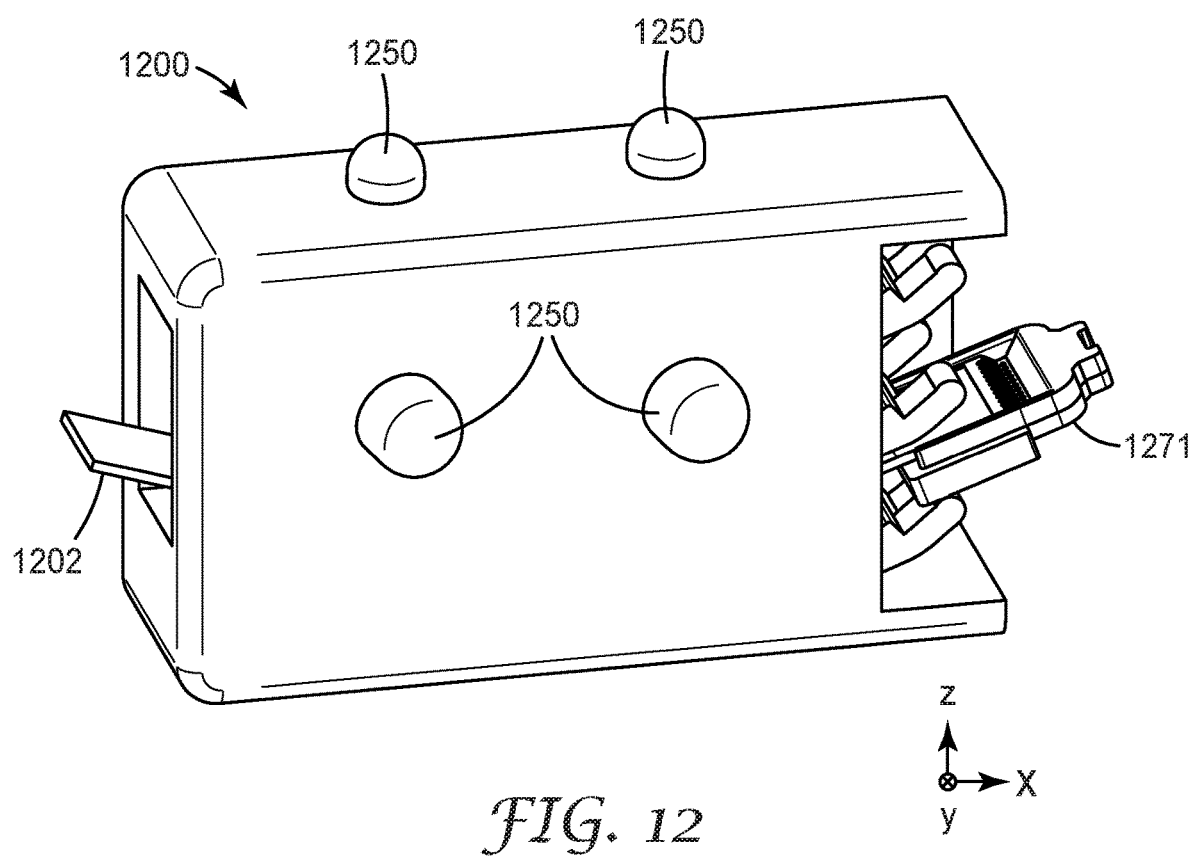
FIG. 12 illustrates an optical ferrule support module having solid sidewalls in accordance with some embodiments.

FIGS. 11A through 11D and FIG. 12 illustrate optical ferrule support modules 1100, 1200 in accordance with some embodiments. FIGS. 11A through 11D depict an optical ferrule support module 1100 configured to hold optical cable subassemblies comprising optical ferrules and waveguides within an open-sided structure wherein at least a portion of the passageways within the support module 1100 is exposed. FIG. 12 depicts an optical ferrule support module 1200 configured to hold optical cable subassemblies comprising optical ferrules and waveguides within a closed-sided structure wherein passageways within the support module 1200 are not exposed. The open-sided optical ferrule support module 1100 can allow for higher density packing of optical ferrules within a modular connector when compared to the ferrule density of the closed-sided support structure 1200. Ferrule support modules 1100, 1200 each include module connecting features, e.g., pins 1250 and sockets 1260 located at top, bottom, left and/or right sidewalls. The pins 1250 are configured to engage with a compatible socket of a mating ferrule support module and the sockets 1260 are configured to engage with a compatible pin of the mating ferrule support module. The module connecting features 1250, 1260 can facilitate one dimensional or two dimensional stacking the ferrule support modules 1100, 1200 in the modular connector.

Returning now to FIGS. 11A through 11D, optical ferrule support module 1100 includes passageways 1162 within the support module 1100 that are dimensioned to receive optical cable subassemblies 1170 comprising optical waveguides 1105 attached to optical ferrules 1171. Optical ferrule support module 1100 includes side walls, e.g., top 1101, bottom 1102, left 1103, and right 1104 side walls, wherein one or more of the left and right sidewalls 1103, 1104 is a partial sidewall that exposes at least a portion of the passageways 1162 within the optical ferrule support module 1100. When the ferrule support module 1100 is coupled to a neighboring support module via module connecting features 1250, 1260, the passageways 1162 of the ferrule support module 1100 become covered by sidewall 1104 of the neighboring support port.

The optical cable subassemblies 1170 shown in FIGS. 11A through 11D each include a cable retainer 1150 attached to the waveguides 1105 of the cable subassembly 1170. Optionally, each of the optical cable subassemblies 1170 includes a strain relief 1180. Each passageway 1162 is dimensioned to receive and contain a section of an optical cable subassembly 1170. The passageways 1162 each include a retainer mount 1111 configured to receive the cable retainer 1150. The walls 1162a, 1162b of the passageways 1162 between the retainer mount 1111 and the non-mating end 1152 of the ferrule support module 1100 may be configured to support the optical cable subassembly 1170 while the optical cable subassembly 1170 is in an unmated position or is in a mated position.

In various embodiments, the passageways 1162 within the ferrule support module 1100 may have any suitable shape or volume. The volume of a passageway 1162 is sufficient to allow the optical waveguides 1105 of the optical cable subassembly 1170 to develop a predetermined bend 1190 that provides the mating spring force for the optical ferrule 1171. The bend 1190 provides a spring force at the mating angle of the optical ferrule 1171 that maintains the optical ferrule 1171 in optical communication with a mating optical ferrule 1191 when the optical ferrule 1171 is mated with an optical ferrule 1191 of a mating optical ferrule support module 1181 as illustrated by FIG. 11D.

The walls 1162a, 1162b of the passageways 1162 may have any convenient shape, and are shown in FIGS. 11A through 11D as curved walls in at least the forward section 1155a of the ferrule support module (between the retainer mounts 1111 and the mating end 1151). The curved walls 1162a, 1162b of passageways 1162 accommodate a gentle −z direction bend 1190 of the plurality of optical waveguides 1105. In some implementations, when the optical ferrule 1171 is mated with a mating optical ferrule, the optical ferrule 1171 and the plurality of optical waveguides 1105 "float" within the passageways 1162 such that neither the optical waveguides 1105 nor the optical ferrule 1171 touch the curved walls 1162a, 1162b or other surfaces of the passageway 1162 in forward section 1155a of the ferrule support module.

The ferrule support module 1100 optionally includes one or more support features 1185a,b at the mating end 1151 that support the optical waveguides 1105 and/or the optical ferrules 1171 so that the optical ferrules 1171 are in a position for mating. In some embodiments, the position for mating may be angled with respect to the mating direction of the modular connector along the x axis as shown in FIG. 11A. An optical ferrule 1171 is in a mating position before it mates with another optical ferrule after which (in some embodiments) the optical ferrule 1171 is in the "floating" mated position. In some embodiments, when in the mated position, the optical ferrule 1171 floats above support feature 1185b and below support feature 1185a. In the example illustrated in FIGS. 11A through 11D, the support features 1185a,b comprise dual support arms that extend outwardly from the passageways 1162.

The ferrule support module includes retainer mounts 1111 in passageways 1162. Each retainer mount 1111 is configured to couple with a cable retainer 1150 of an optical cable subassembly 1170. The section of the ferrule support module that includes the mating end 1151, as indicated by arrow 1199a, is referred to herein as the forward section 1155a of the ferrule support module 1100. In the embodiment illustrated in FIGS. 11A through 11D, the mating end 1151 includes optical ferrule support features 1185a, 1185b. The section of the ferrule support module 1100 that includes retainer mounts 1111 and the non-mating end 1152 of the ferrule support module 1100, indicated by arrow 1199b, is referred to herein as the rear section 1155b of the ferrule support module 1100. Coupling the cable retainer 1150 to the retainer mount 1111 within the ferrule support module 1100 fixes the position of the retainer attachment area 1113 of the optical cable subassembly 1170 within the ferrule support module 1100, or at least fixes the position of the retainer attachment area 1113 within the rear section 1155b of ferrule support module 1100, when the optical cable subassembly 1170 is in the mated position.

In some embodiments, when the cable retainer 1150 is installed in the retainer mount 1111 and the optical cable subassembly 1102 is in the unmated position, there may be some movement (e.g., along the x and or z axes shown in FIG. 11A) of the cable retainer 1150. When the optical cable subassembly 1170 mates with a compatible optical cable subassembly and is in the mated position, the position of the retainer attachment area 1113 of the optical cable subassembly 1170 is fixed by the interaction of the cable retainer 1150 and the retainer mount 1111. Fixing the position of the retainer attachment area 1113 provides for developing the bend 1190 and the spring force in the optical waveguides 1105 such that the optical ferrule 1171 in the mated position is able to float. The optical ferrule 1171 and the optical waveguide 1105 are held away from the passageway walls 1162a, 1162b and/or the supports 1185 by the spring force of the optical waveguides 1105 and the plurality of optical waveguides 1187 of a mating optical cable subassembly 1182 (as shown in FIG. 11D). In some embodiments, when the cable retainer 1150 is coupled with the retainer mount 1111, the retainer attachment area 1113 may be the only point of attachment of the optical cable subassembly 1170 to the ferrule support module 1100. In the mated position, the cable retainer 1150 and the retainer mount 1111 support the optical cable subassembly 1170 and attach the optical cable subassembly 1170 to the ferrule support module 1100, fixing the position of the retainer attachment area 1113 within the ferrule support module 1100.

As illustrated in FIGS. 11A and 11B, the retainer mount 1111 can be a slot in the passageway 1162 dimensioned to hold the cable retainer 1150 within the ferrule support module 1100. Although the cable retainer 1150 is illustrated in FIGS. 11A through 11C as being attached to one waveguide array 1105, in some embodiments, a cable retainer may be attached to multiple waveguides or to multiple waveguide arrays. Additional information regarding optical ferrules, alignment frames, and connectors that may be used in conjunction with the latching approaches described herein is provided in commonly owned and concurrently filed U.S. Patent Application Ser. No. 62/240,069, having the title "Optical Ferrules"; and U.S. Patent Application Ser. No. 62/240,066, having the title "Ferrules, Alignment Frames and Connectors;" and U.S. Patent Application Ser. No. 62/240,008, having the title "Optical Cable Assembly with Retainer,", all of which are all incorporated herein by reference.

Figure 13A:
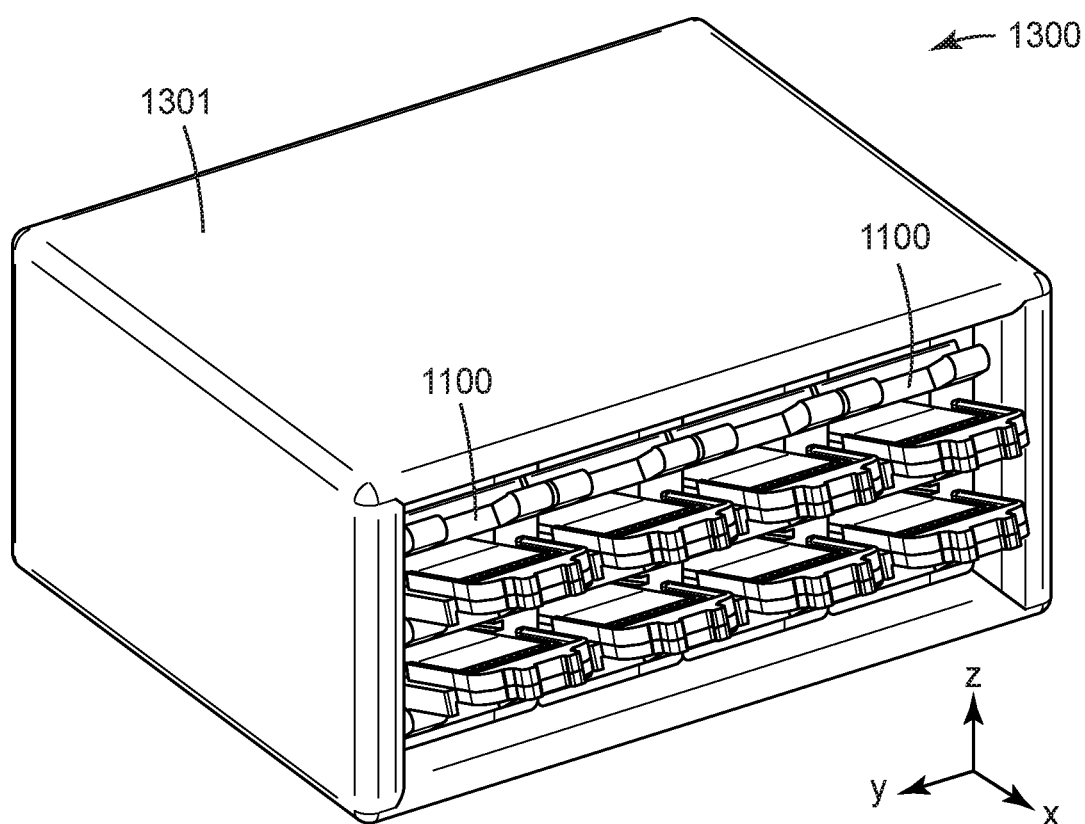
FIGS. 13A and 13B show a modular connector comprising a frame and having multiple ferrule support modules as shown in FIGS. 11A through 11D.
Figure 13B:
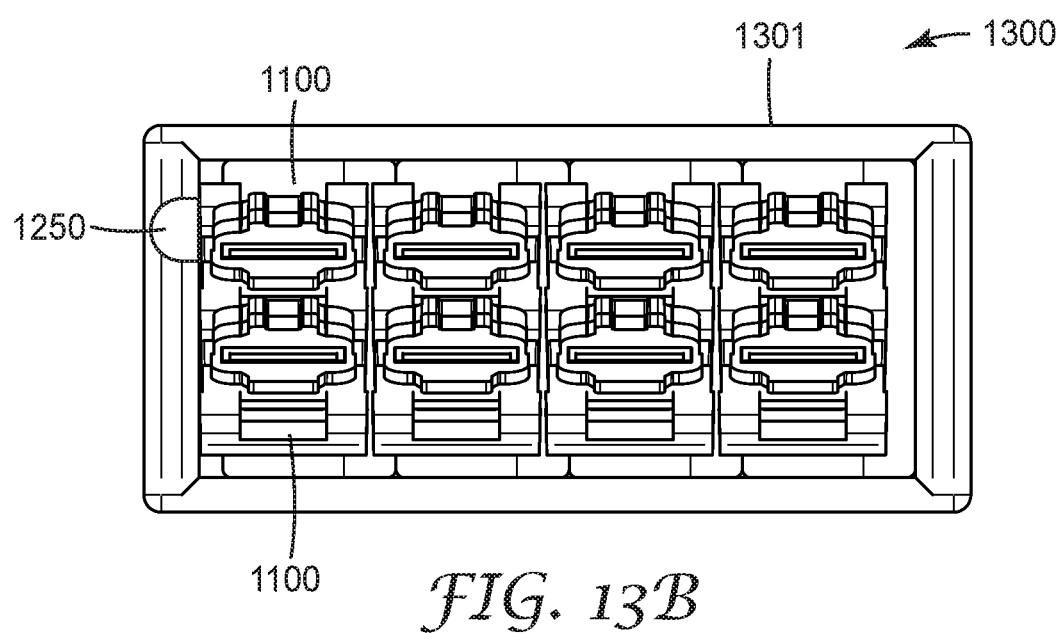

FIGS. 13A and 13B show a modular connector 1300 comprising a frame 1301 and having multiple ferrule support modules 1100, e.g., as described in FIGS. 11A through 11D, wherein the ferrule support modules 1100 are stacked within the frame 1301 along the lateral (y-) axis.

Figure 14:
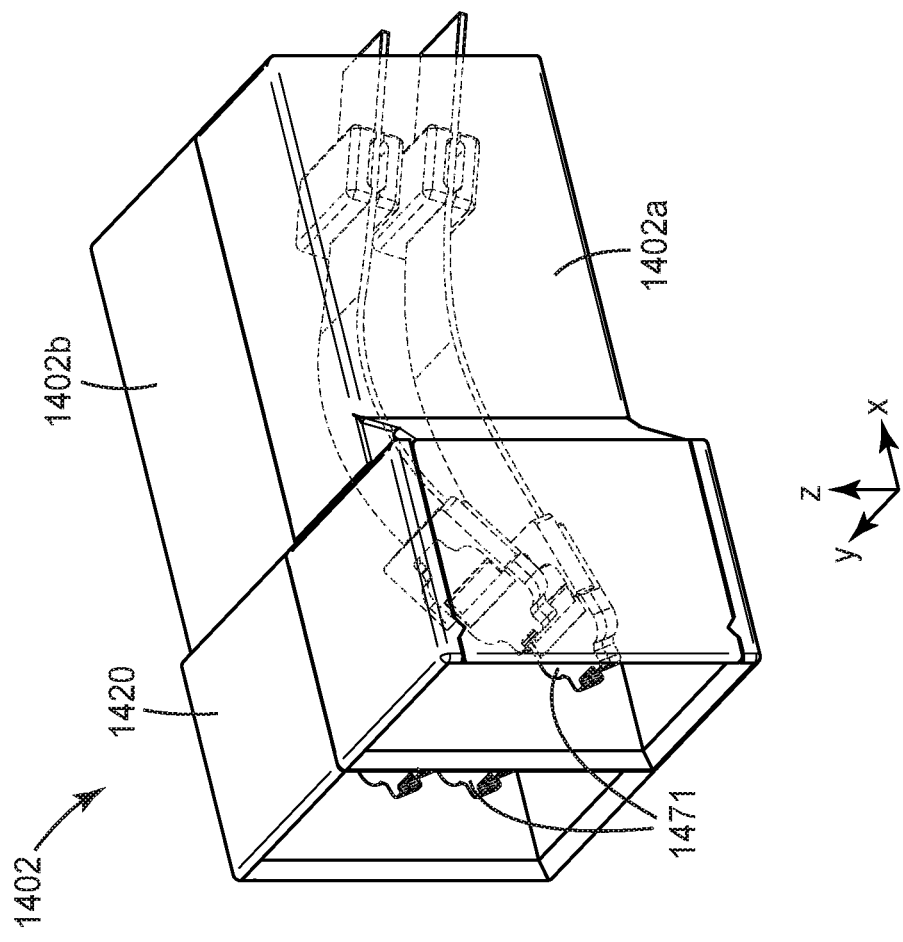
FIG. 14 is a perspective illustration of mating modular optical connectors that each include a protective shroud.
Figure 14:
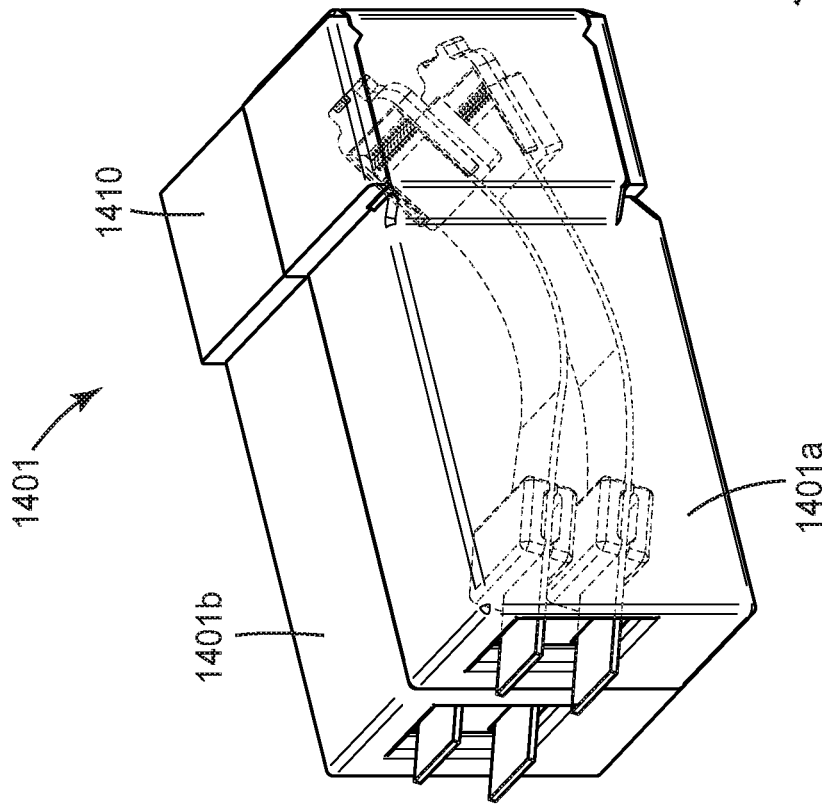

In various embodiments, the modular optical connector may include a protective cover configured to protect the optical ferrules from damage or contamination. FIGS. 14 through 16 illustrate several protective cover configurations. FIG. 14 is a perspective illustration of mating modular optical connectors 1401, 1402. Modular optical connector 1401 includes ferrule support module 1401a and ferrule support module 1401b. Modular optical connector 1402 includes ferrule support module 1402a and ferrule support module 1402b. Each of the ferrule support modules 1401a, 1401b, 1402a, 1402b are configured to support optical cable subassemblies that include optical ferrules 1471. Ferrule support modules 1401a and 1401b, when interconnected, form a male protective shroud 1410. Ferrule support modules 1402a and 1402b, when interconnected, form a female protective shroud 1420. The protective shrouds 1410, 1420 extend over the optical ferrules 1471 to protect them. In the illustrated embodiment, the protective shrouds 1410, 1420 are fixed on the modular connectors 1401, 1402, and engage with the mating protective shroud. A shroud may be disposed on the optical ferrule support modules, on the frame, or on the secondary frame of the connector.

Figure 15A:
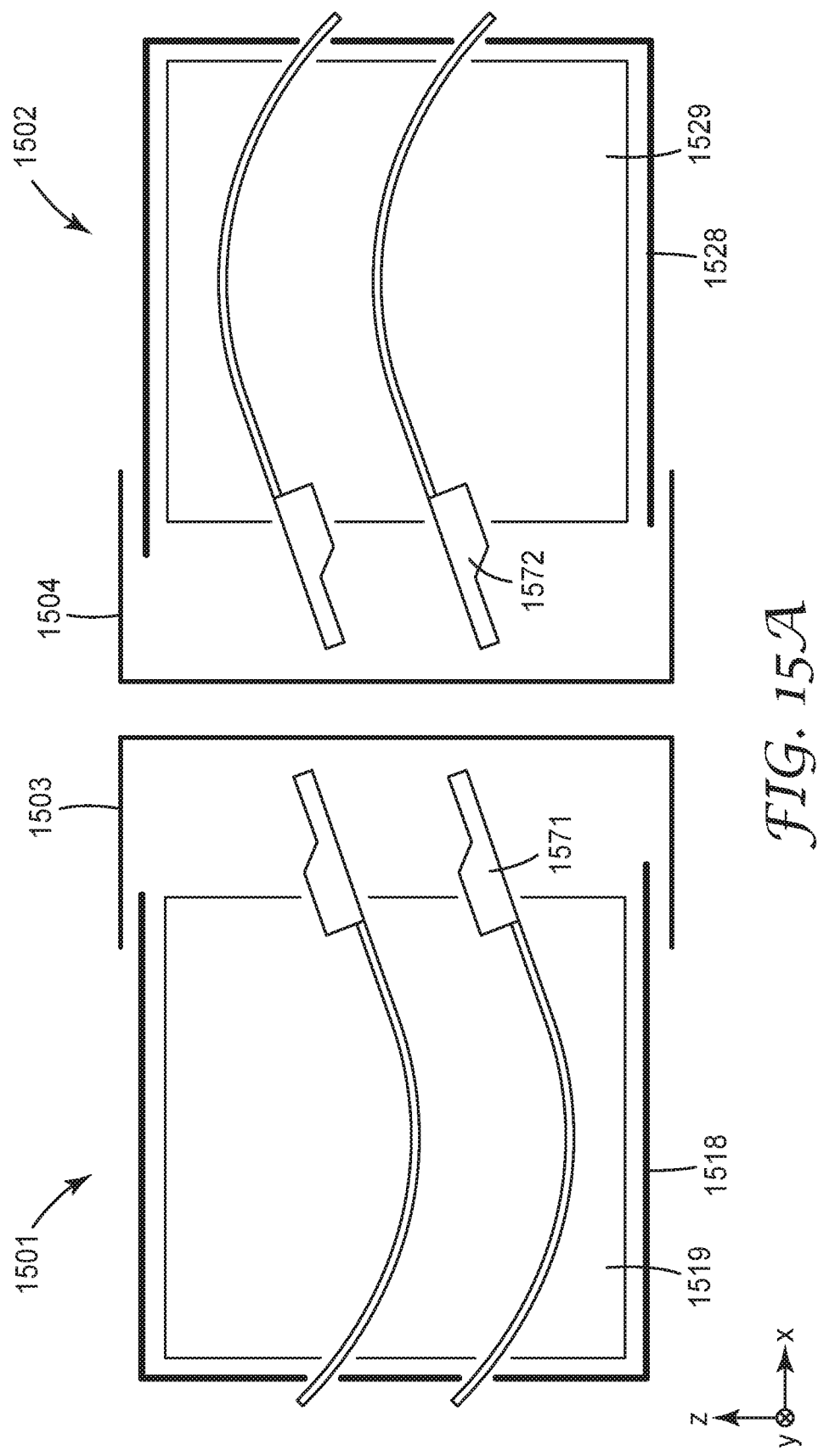
FIG. 15A provides a side view of mating hermaphroditic modular connectors wherein modular connector includes a removable protective cover.
Figure 16:
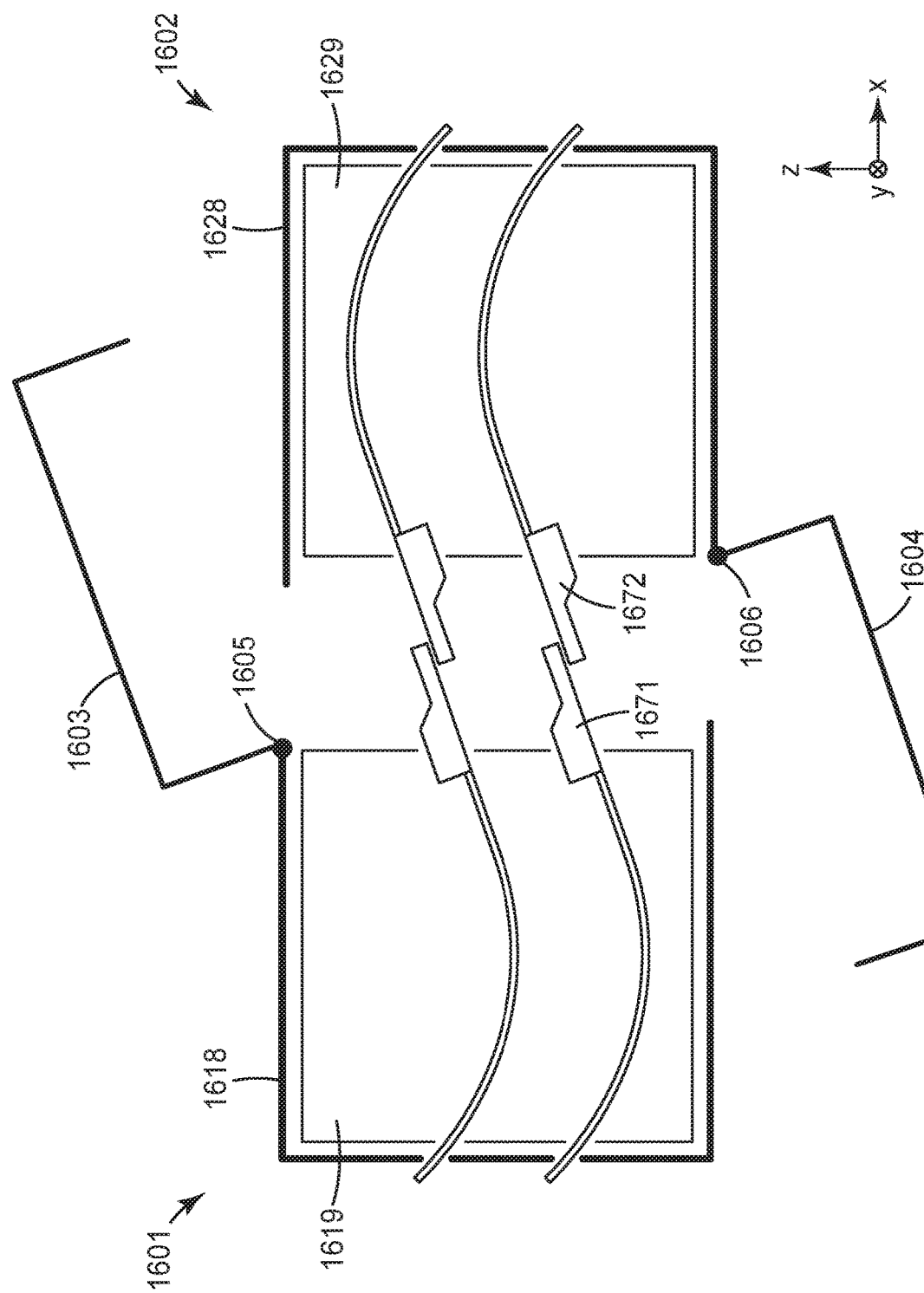
FIG. 16 is a side view of a modular connector having a hinged protective cover.

FIG. 15A provides a side view of mating hermaphroditic modular connectors 1501, 1502. Modular connector 1501 includes multiple ferrule support modules 1519 laterally stacked along the y axis within frame 1518 (only one of the ferrule support module 1519 is shown in FIG. 15A). Modular connector 1502 includes multiple ferrule support modules 1529 laterally stacked along the y axis within frame 1528 (only one of the ferrule support module 1519 is shown in FIG. 15A). Optical ferrules 1571, 1572 are shown within the ferrule support modules 1519, 1529. Each modular connector 1501, 1502 includes a separate, removable protective cover 1503, 1504 that is disposed over the mating end of the frame 1518, 1528. In some embodiments, protective cover 1503 covers all of the optical ferrule support modules 1519 held by frame 1518 and protective cover 1504 covers all of the optical ferrule support modules 1529 held by frame 1528. The protective covers 1503, 1504 are configured to be manually removed before the modular connectors 1501, 1502 are mated.

Figure 15B:
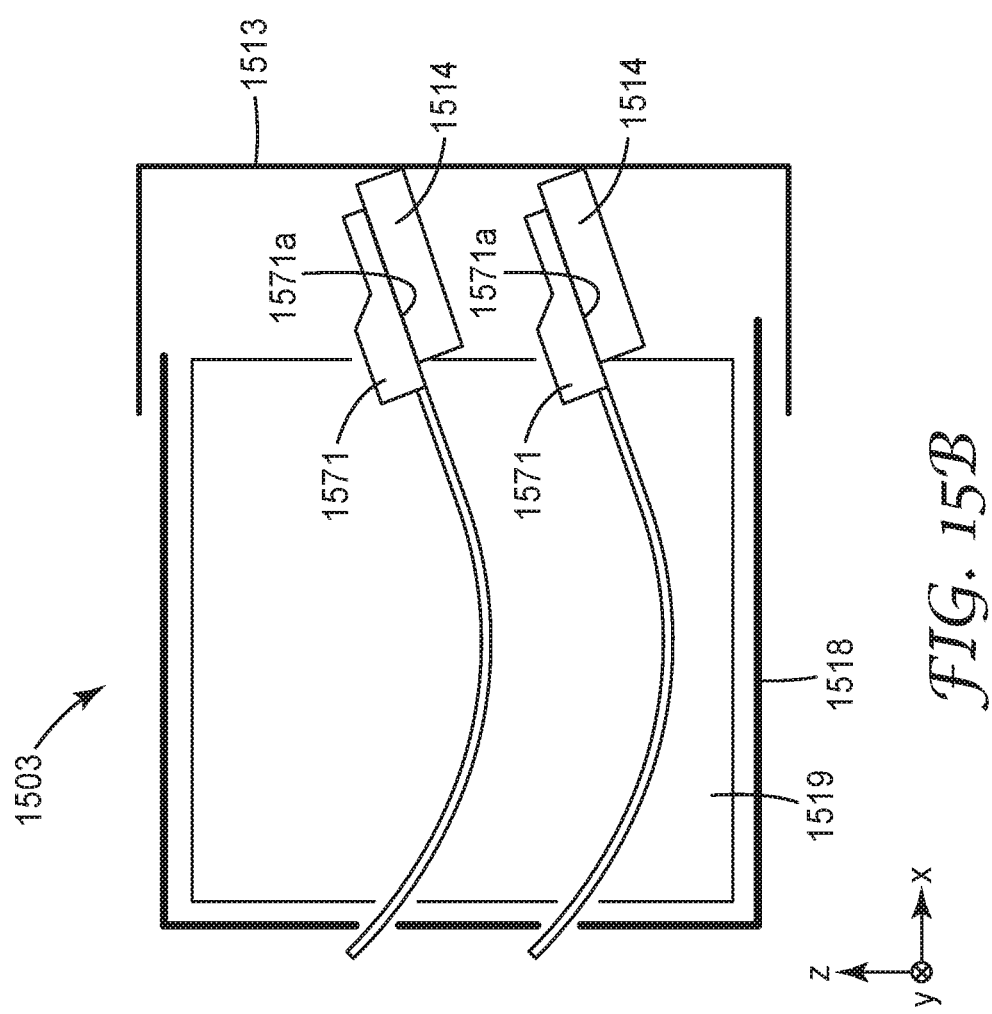
FIG. 15B is a side view of a modular connector having a removable protective cover that includes cleaning features.

FIG. 15B illustrates a side view of a modular connector 1503. Modular connector 1503 includes multiple ferrule support modules 1519 laterally stacked along the y axis within frame 1518 (only one of the ferrule support module 1519 is shown in FIG. 15B). Optical ferrules 1571 are shown extending from the ferrule support module 1519. The modular connector 1503 includes a separate, removable protective cover 1513 that can be disposed over the mating end of the frame entire frame 1518. Alternatively, separate removable protective covers can be individually disposed over each ferrule support module 1519. The protective cover(s) 1513 are configured to be manually removed before the modular connectors 1503 is mated to a mating connector. Protective cover 1513 includes self-cleaning features 1514 configured to slide against the mating surfaces 1571a of the optical ferrules 1571 when the cover 1513 is installed on the frame (or ferrule support module). The cleaning features 1514 may include grooves (as previously discussed) or other dust mitigation features.

FIG. 16 provides a side view of mating hermaphroditic modular connectors 1601, 1602 having multiple optical ferrule support modules 1619, 1629 disposed respectively in frames 1618, 1628. The optical ferrules 1671, 1672 are shown extending from the ferrule support modules 1619, 1629. Each modular connector 1601, 1602 includes a protective cover 1603, 1604 coupled to the frame 1618, 1628 by a hinge 1605, 1606. The protective covers 1603, 1605 can be moved via the hinges 1605, 1606 to expose the light coupling units 1671, 1672 before modular connectors 1601, 1602 are mated.

FIGS. 17A and 17B depict side views of modular connectors 1701, 1702 having spring actuated retractable protective shrouds. FIG. 17A shows the position of the protective cover 1703 of modular connector 1701 prior to mating. FIG. 17B shows the position of protective shrouds 1703, 1704 after mating. The hermaphroditic modular connectors 1701, 1702 each have multiple ferrule support modules 1719, 1729 disposed within frames 1718, 1728 and arranged along the y-axis. The optical ferrules 1771, 1772 are shown extending from the ferrule support modules 1719, 1729. Each modular connector 1701, 1702 includes a retractable protective shroud 1703, 1704 actuated by a spring 1705, 1706. The protective shrouds 1703, 1705 are pushed back, compressing the springs 1705, 1706 as the connector assemblies 1701, 1702 are mated.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Additional information regarding ferrules, alignment frames, and connectors that may be used in conjunction with the approaches described herein is provided in the following commonly owned and concurrently filed U.S. Patent Applications which are incorporated herein by reference: U.S. Patent Application Ser. No. 62/239,998, having the title "Connector with Latching Mechanism"; U.S. Patent Application Ser. No. 62/240,069, having the title "Optical Ferrules"; U.S. Patent Application Ser. No. 62/240,066, having the title "Ferrules, Alignment Frames and Connectors;" U.S. Patent Application Ser. No. 62/240,010, having the title "Optical Coupling Device with Waveguide Assisted Registration;" U.S. Patent Application Ser. No. 62/240,008, having the title "Optical Cable Assembly with Retainer;" U.S. Patent Application Ser. No. 62/240,000, having the title "Dust Mitigating Optical Connector;" U.S. Patent Application Ser. No. 62/240,009, having the title "Optical Waveguide Registration Feature;" U.S. Patent Application 62/239,996, having the title "Optical Ferrules and Optical Ferrule Molds;" U.S. Patent Application 62/240,002, having the title "Optical Ferrules with Waveguide Inaccessible Space,"U.S. Patent Application Ser. No. 62/240,005, having the title "Hybrid Connectors."

Items described herein include:

Item 1. A modular optical connector comprising:
a plurality of coupled optical ferrule support modules, each optical ferrule support module comprising:
module connecting features configured to couple each ferrule support module with one or more neighboring ferrule support modules of the plurality of ferrule support modules;
one or more optical ferrules disposed within and configured to rotate within the ferrule support module, each optical ferrule comprising a first attachment area configured to attach to one or more optical waveguides; and
one or more passageways within the ferrule support module, each passageway configured to receive the one or more optical waveguides and comprising a second attachment area configured to attach to the optical waveguides that are attached to the optical ferrule at the first attachment area, the passageway dimensioned to constrain the optical waveguides to bend within the housing between the first attachment area and the second attachment area.

Item 2. The connector of item 1, wherein the optical ferrule support module includes first, second, third, and forth sidewalls and the module connecting features are disposed on an exterior of at least two sidewalls.

Item 3. The connector of item 2, wherein the module connecting features are disposed on the exterior of at least two adjacent sidewalls.

Item 4. The connector of item 2, wherein the module connecting features are disposed on the exterior of at least non-adjacent sidewalls.

Item 5. The connector of item 2, wherein the module connecting features are disposed on the exterior of at least two parallel sidewalls.

Item 6. The connector of item 2, wherein the module connecting features are disposed on the exterior of at least two non-parallel sidewalls.

Item 7. The connector of any of items 1 through 6, wherein the optical ferrule support modules are stacked along two perpendicular axes.

Item 8. The connector of any of items 1 through 7, wherein the optical ferrules are configured to move both rotationally and translationally within the optical ferrule support module.

Item 9. The connector of any of items 1 through 8, wherein, during mating, movement of the optical ferrules causes the optical waveguides to bend further and the bend provides a predetermined spring force that maintains the optical ferrules in a mated position with mating optical ferrules.

Item 10. The connector of any of items 1 through 9, wherein the one or more optical ferrules are configured to rotate together.

Item 11. The connector of any of items 1 through 10, wherein each of the one or more optical ferrules are configured to rotate independently from other optical ferrules of the one or more optical ferrules.

Item 12. The connector of any of items 1 through 11, wherein each optical waveguide is attached to a strain relief feature.

Item 13. The connector of any of items 1 through 12, wherein each passageway in the optical ferrule support module includes curved walls and each of one or more optical waveguides are disposed between the curved walls of a passageway.

Item 14. The connector of any of items 1 through 13, wherein the optical ferrule support module further comprises arms extending from walls of the passageways, the arms configured to hold the optical ferrules in a mating position, wherein the optical ferrules float above the arms when the optical ferrules are in the mated position.

Item 15. The connector of any of items 1 through 14, wherein each optical ferrule support module comprises alignment features configured to align the optical ferrule support module with a mating optical ferrule support module.

Item 16. The connector of any of items 1 through 15, wherein:

each optical ferrule support module comprises an inner support structure; and the passageways are disposed within the inner support structure.

Item 17. The connector of any item 16, wherein the inner support structure is coupled to an interior of the sidewalls of the optical ferrule support module by compliant features.

Item 18. The connector of item 16, wherein the inner support structure is coupled to an interior of the sidewalls of the optical ferrule support module by features that allow the inner support structure to move translationally and rotationally.

Item 19. The connector of item 16, wherein the inner support structure includes alignment features configured to align the inner support structure with a mating inner support structure.

Item 20. The connector of item 19, wherein the alignment features comprise a pin and socket.

Item 21. The connector of item 19, wherein the alignment features comprise flexible arms that engage with sides of the mating inner support structure.

Item 22. The connector of any of items 1 through 21, wherein the plurality of coupled optical ferrule support modules are disposed within a frame.

Item 23. The connector of item 22, wherein the frame is disposed within a secondary frame.

Item 24. The connector of item 23, wherein the frame is coupled to the secondary frame by compliant features.

Item 25. The connector of item 22, wherein the frame includes alignment features configured to align the frame with a mating frame.

Item 26. The connector of item 25, wherein the alignment features comprise a pin and a socket.

Item 27. The connector of item 25, wherein the alignment features comprise flexible arms that engage with sides of the mating frame.

Item 28. The connector of item 23, wherein the secondary frame includes alignment features configured to align the secondary frame with a mating secondary frame.

Item 29. The connector of any of items 1 through 28, further comprising end pieces coupled to the coupled optical ferrule support modules.

Item 30. The connector of item 29, wherein the end pieces include mounting features configured for mounting the coupled optical ferrule support modules to a substrate.

Item 31. The connector of any of items 1 through 30, wherein each optical ferrule support structure has a partial sidewall that exposes the passageways within the optical ferrule support structure.

Item 32. The connector of any of items 1 through 31, further comprising:

at least one cable retainer attached to the one or more optical waveguides; and a retainer mount within each passageway, the retainer mount configured to receive the cable retainer, wherein reception of the cable retainer by the retainer mount provides the second attachment area of the one or more optical waveguides.

Item 33. The connector of any of items 1 through 32, further comprising a protective shroud positioned at a mating end of the modular optical connector and configured to protect the optical ferrules.

Item 34. The connector of item 33, wherein the shroud is a retractable shroud.

Item 35. The connector of any of items 1 through 34, further comprising a protective cover positioned at a mating end of the modular optical connector and configured to protect the optical ferrules.

Item 36. The connector of item 35, wherein the cover is a hinged cover.

Item 37. The connector of item 35, wherein the cover includes cleaning features that engage with mating surfaces of the optical ferrules when the cover is installed on the optical connector.

Item 38. The connector of any of items 1 through 37, wherein each optical ferrule includes dust mitigation features disposed on a mating surface of the optical ferrule.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A modular optical connector comprising:

an inner frame;

a secondary frame, the inner frame being disposed within and configured to move within the secondary frame; and a plurality of coupled optical ferrule support modules disposed within the inner frame, each optical ferrule support module comprising:

module connecting features configured to couple each ferrule support module with one or more neighboring ferrule support modules of the plurality of ferrule support modules;

one or more optical ferrules disposed within and configured to rotate within the ferrule support module, each optical ferrule comprising a first attachment area configured to attach to one or more optical waveguides; and one or more passageways within the ferrule support module, each passageway configured to receive the one or more optical waveguides and comprising a second attachment area configured to attach to the optical waveguides that are attached to the optical ferrule at the first attachment area, the passageway dimensioned to constrain the optical waveguides to bend within the ferrule support module between the first attachment area and the second attachment area, the one or more passageways comprising at least one passageway comprising opposing first and second curved walls, each of the first and second curved walls extending from the second attachment area to a mating end of the ferrule support module, wherein the modular optical connector is configured to mate with a mating connector.

2. The modular optical connector of claim 1, wherein at least one optical ferrule support module comprises a plurality of passageways therein, a curved wall separating each of the passageways from the other passageways in the plurality of passageways.

* * * * *